United States Patent
Kezuka et al.

(10) Patent No.: US 8,041,682 B2
(45) Date of Patent: *Oct. 18, 2011

(54) STORAGE CONTROL SYSTEM AND METHOD

(75) Inventors: Teiko Kezuka, Odawara (JP); Akira Murotani, Odawara (JP); Seiichi Higaki, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/862,103

(22) Filed: Aug. 24, 2010

(65) Prior Publication Data

US 2010/0325355 A1    Dec. 23, 2010

Related U.S. Application Data

(63) Continuation of application No. 12/194,638, filed on Aug. 20, 2008, now Pat. No. 7,801,933, which is a continuation of application No. 11/328,103, filed on Jan. 10, 2006, now Pat. No. 7,430,572, which is a continuation of application No. 10/880,503, filed on Jul. 1, 2004, now Pat. No. 7,035,883.

(30) Foreign Application Priority Data

Apr. 9, 2004  (JP) ................................ 2004-116069

(51) Int. Cl.
*G06F 17/30* (2006.01)
(52) U.S. Cl. ........ 707/655; 711/167; 711/155; 711/154; 711/114; 709/238; 707/656; 707/659; 707/660

(58) Field of Classification Search ............... 707/999.2, 707/999.205, 655, 656, 659, 660; 711/114, 711/154, 155, 167; 709/238
See application file for complete search history.

(56) References Cited

U.S. PATENT DOCUMENTS

| 5,051,887 | A | | 9/1991 | Berger et al. |
| 5,278,970 | A | * | 1/1994 | Pence ............................ 710/68 |
| 5,313,585 | A | | 5/1994 | Jeffries et al. |
| 5,313,626 | A | | 5/1994 | Jones et al. |
| 5,473,761 | A | | 12/1995 | Parks et al. |
| 5,483,641 | A | | 1/1996 | Jones et al. |
| 5,506,977 | A | | 4/1996 | Jones |
| 5,530,960 | A | | 6/1996 | Parks et al. |

(Continued)

FOREIGN PATENT DOCUMENTS

JP          02-040182 A       2/1990

(Continued)

OTHER PUBLICATIONS

English translation of foreign Office Action filed with Information Disclosure Statement filed on Jun. 24, 2011.

*Primary Examiner* — Jean M Corrielus
(74) *Attorney, Agent, or Firm* — Mattingly & Malur, PC

(57) ABSTRACT

A disk array system including a plurality of disk drives, including: a plurality of first-type disk drives being used to form a first-type logical unit having a plurality of a first-type of chunks; a plurality of second-type disk drives being used to form a second-type logical unit having a plurality of a second-type of chunks; and a storage controller, if the storage controller copies data stored in a source chunk to a destination chunk, selecting the destination chunk from the first-type of chunks or the second-type of chunks.

55 Claims, 14 Drawing Sheets

U.S. PATENT DOCUMENTS

| | | | | |
|---|---|---|---|---|
| 5,546,558 | A | 8/1996 | Jacobson et al. | |
| 5,619,690 | A * | 4/1997 | Matsumani et al. | 1/1 |
| 5,619,723 | A | 4/1997 | Jones et al. | |
| 5,664,187 | A | 9/1997 | Burkes et al. | |
| 5,974,544 | A | 10/1999 | Jeffries et al. | |
| 6,032,224 | A | 2/2000 | Blumenau | |
| 6,446,161 | B1 | 9/2002 | Yamamoto et al. | |
| 6,502,169 | B1 | 12/2002 | Noya | |
| 6,839,827 | B1 | 1/2005 | Beardsley et al. | |
| 6,851,027 | B2 | 2/2005 | Hansen | |
| 6,973,549 | B1 | 12/2005 | Testardi | |
| 6,986,015 | B2 | 1/2006 | Testardi | |
| 7,013,379 | B1 | 3/2006 | Testardi | |
| 7,096,338 | B2 | 8/2006 | Takahashi et al. | |
| 7,111,138 | B2 | 9/2006 | Higaki et al. | |
| 7,165,142 | B2 | 1/2007 | Lee et al. | |
| 7,173,235 | B2 | 2/2007 | Ito | |
| 7,200,074 | B2 | 4/2007 | Kano et al. | |
| 7,203,135 | B2 | 4/2007 | Kano et al. | |
| 7,222,172 | B2 | 5/2007 | Arakawa et al. | |
| 7,281,088 | B2 | 10/2007 | Yamazaki et al. | |
| 7,325,117 | B2 | 1/2008 | Iwamitsu et al. | |
| 7,363,446 | B2 | 4/2008 | Higaki et al. | |
| 7,386,598 | B2 | 6/2008 | Mannen et al. | |
| 7,398,418 | B2 | 7/2008 | Soran et al. | |
| 7,424,585 | B2 | 9/2008 | Takahashi et al. | |
| 7,469,289 | B2 | 12/2008 | Arakawa et al. | |
| 7,595,948 | B1 | 9/2009 | Oberg | |
| 7,627,699 | B1 | 12/2009 | Arumugham et al. | |
| 7,685,129 | B1 | 3/2010 | LeCrone et al. | |
| 7,801,933 | B2 * | 9/2010 | Kezuka et al. | 707/999.2 |
| 2002/0099914 | A1 | 7/2002 | Matsunami et al. | |
| 2003/0014534 | A1 | 1/2003 | Watanabe et al. | |
| 2003/0126388 | A1 | 7/2003 | Yamagami | |
| 2003/0204597 | A1 | 10/2003 | Arakawa et al. | |
| 2004/0024964 | A1 | 2/2004 | Taninaka et al. | |
| 2004/0225697 | A1 | 11/2004 | Asano et al. | |

FOREIGN PATENT DOCUMENTS

| | | |
|---|---|---|
| JP | 3-51908 A | 3/1991 |
| JP | 06-035624 A | 2/1994 |
| JP | 7-73090 A | 3/1995 |
| JP | 09-223049 A | 8/1997 |
| JP | 10/326156 | 12/1998 |
| JP | 11-232041 A | 8/1999 |
| JP | 11-259240 A | 9/1999 |
| JP | 2001-243099 A | 9/2001 |
| JP | 2002-222061 A | 8/2002 |
| JP | 2003-99309 A | 4/2003 |
| JP | 2003-316616 A | 7/2003 |
| JP | 2003-248606 A | 9/2003 |
| JP | 2004-94755 A | 3/2004 |

* cited by examiner

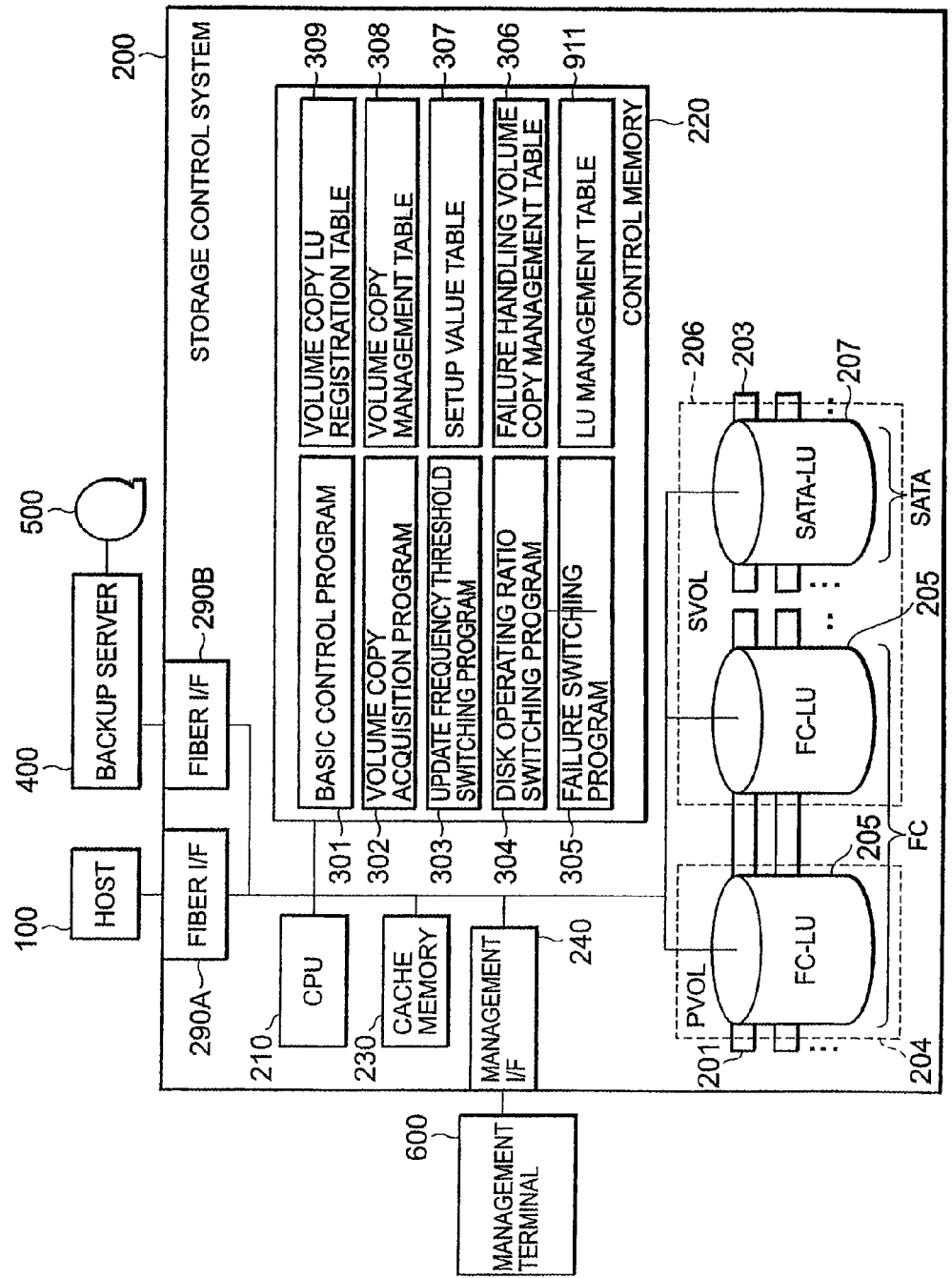

| A PAIR NUMBER | EXTERNAL LU NUMBER | INTERNAL LU NUMBER | LU CAPACITY | DISK TYPE | PVOL/SVOL INFORMATION | ACCESS ATTRIBUTE |
|---|---|---|---|---|---|---|
| 1 | 1 | 1 | 100GB | FC | P-VOL | R/W ENABLE |
| 1 | 2 | 2 | 100GB | FC | S-VOL | R ONLY |
| 1 | 2 | 3 | 100GB | SATA | S-VOL | R ONLY |
| ... | | | | | | |

| ROW NUMBER | ORIGINAL DATA (PVOL) | | | VOLUME COPY (SVOL) | | | SWITCHING PARTNER | | |
|---|---|---|---|---|---|---|---|---|---|
| | LU # | CHUNK # | UPDATE FREQUENCY | DISK TYPE | LU # | CHUNK # | DISK TYPE | LU # | CHUNK # |
| 1 | 1 | 1 | 120 | FC | 2 | 1 | SATA | 3 | 5 |
| 2 | 1 | 2 | 178 | FC | 2 | 2 | | | |
| 3 | 1 | 3 | 87 | SATA | 3 | 1 | FC | 2 | 5 |
| 4 | 1 | 4 | 230 | FC | 2 | 3 | | | |
| 5 | 1 | 5 | 145 | FC | 2 | 4 | | | |
| 6 | 1 | 6 | 21 | SATA | 3 | 2 | | | |
| 7 | 1 | 7 | 0 | SATA | 3 | 3 | | | |
| 8 | 1 | 8 | 0 | SATA | 3 | 4 | | | |

FIG. 5

| ITEM | VALUE |
| --- | --- |
| CHUNK SIZE | 100 MB |
| SWITCHING PERIOD | WEEKLY |
| UPDATE FREQUENCY THRESHOLD | 100 |
| DISK RATIO THRESHOLD (FC/SATA OF SVOL) | 0.5 |

| ORIGINAL DATA (PVOL) | | VOLUME COPY (SVOL) | | | FAILURE HANDLING SHIFT DESTINATION CHUNK | | |
|---|---|---|---|---|---|---|---|
| LU # | CHUNK # | DISK TYPE | LU # | CHUNK # | DISK TYPE | LU # | CHUNK # |
| 1 | 1 | FC | 2 | 1 | | | |
| 1 | 2 | FC | 2 | 2 | | | |
| 1 | 3 | SATA | 3 | 1 | FC | 4 | 1 |
| 1 | 4 | FC | 2 | 3 | | | |
| 1 | 5 | FC | 2 | 4 | | | |
| 1 | 6 | SATA | 3 | 2 | FC | 4 | 2 |
| 1 | 7 | SATA | 3 | 3 | FC | 4 | 3 |
| 1 | 8 | SATA | 3 | 4 | FC | 4 | 4 |

FIG. 12(A)

| ORIGINAL DATA (PVOL) | | | VOLUME COPY (SVOL) | | | SWITCHING PARTNER CHUNK | | |
|---|---|---|---|---|---|---|---|---|
| LU # | CHUNK # | UPDATE FREQUENCY | DISK TYPE | LU # | CHUNK # | DISK TYPE | LU # | CHUNK # |
| 1 | 1 | 0 | | | | | | |
| 1 | 2 | 0 | | | | | | |
| 1 | 3 | 0 | | | | | | |
| 1 | 4 | 0 | | | | | | |
| 1 | 5 | 0 | | | | | | |
| 1 | 6 | 0 | | | | | | |
| 1 | 7 | 0 | | | | | | |
| 1 | 8 | 0 | | | | | | |

FIG. 12(B)

| ORIGINAL DATA (PVOL) | | | VOLUME COPY (SVOL) | | | SWITCHING PARTNER CHUNK | | |
|---|---|---|---|---|---|---|---|---|
| LU # | CHUNK # | UPDATE FREQUENCY | DISK TYPE | LU # | CHUNK # | DISK TYPE | LU # | CHUNK # |
| 1 | 1 | 0 | FC | 2 | 1 | | | |
| 1 | 2 | 0 | FC | 2 | 2 | | | |
| 1 | 3 | 0 | FC | 2 | 3 | | | |
| 1 | 4 | 0 | FC | 2 | 4 | | | |
| 1 | 5 | 0 | | | | | | |
| 1 | 6 | 0 | | | | | | |
| 1 | 7 | 0 | | | | | | |
| 1 | 8 | 0 | | | | | | |

FIG. 12(C)

| ORIGINAL DATA (PVOL) | | | VOLUME COPY (SVOL) | | | SWITCHING PARTNER CHUNK | | |
|---|---|---|---|---|---|---|---|---|
| LU # | CHUNK # | UPDATE FREQUENCY | DISK TYPE | LU # | CHUNK # | DISK TYPE | LU # | CHUNK # |
| 1 | 1 | 0 | FC | 2 | 1 | | | |
| 1 | 2 | 0 | FC | 2 | 2 | | | |
| 1 | 3 | 0 | FC | 2 | 3 | | | |
| 1 | 4 | 0 | FC | 2 | 4 | | | |
| 1 | 5 | 0 | SATA | 3 | 1 | | | |
| 1 | 6 | 0 | SATA | 3 | 2 | | | |
| 1 | 7 | 0 | SATA | 3 | 3 | | | |
| 1 | 8 | 0 | SATA | 3 | 4 | | | |

FIG. 13(A)

| ORIGINAL DATA (PVOL) | | VOLUME COPY (SVOL) | | | FAILURE HANDLING SHIFT DESTINATION CHUNK | | |
|---|---|---|---|---|---|---|---|
| LU # | CHUNK # | DISK TYPE | LU # | CHUNK # | DISK TYPE | LU # | CHUNK # |
| 1 | 1 | FC | 2 | 1 | | | |
| 1 | 2 | FC | 2 | 2 | | | |
| 1 | 3 | SATA | 3 | 1 | FC | 4 | 1 |
| 1 | 4 | FC | 2 | 3 | | | |
| 1 | 5 | FC | 2 | 4 | | | |
| 1 | 6 | SATA | 3 | 2 | FC | 4 | 2 |
| 1 | 7 | SATA | 3 | 3 | FC | 4 | 3 |
| 1 | 8 | SATA | 3 | 4 | FC | 4 | 4 |

FIG. 13(B)

| ORIGINAL DATA (PVOL) | | VOLUME COPY (SVOL) | | | FAILURE HANDLING SHIFT DESTINATION CHUNK | | |
|---|---|---|---|---|---|---|---|
| LU # | CHUNK # | DISK TYPE | LU # | CHUNK # | DISK TYPE | LU # | CHUNK # |
| 2 | 1 | | | | | | |
| 2 | 2 | | | | | | |
| 4 | 1 | | | | | | |
| 2 | 3 | | | | | | |
| 2 | 4 | | | | | | |
| 4 | 2 | | | | | | |
| 4 | 3 | | | | | | |
| 4 | 4 | | | | | | |

| INTERNAL LU NUMBER | LU CAPACITY | DISK TYPE | SELECTABILITY | POOL CHUNK |
|---|---|---|---|---|
| 1 | 100GB | FC | YES | |
| 2 | 100GB | FC | YES | |
| 3 | 100GB | SATA | YES | |
| 4 | 100GB | SATA | NO | 1,2,3,4,·· |
| ... | | | | |

911

STORAGE CONTROL SYSTEM AND METHOD

CROSS-REFERENCE TO PRIOR APPLICATION

This is a continuation of U.S. application Ser. No. 12/194,638, filed Aug. 20, 2008 (now U.S. Pat. No. 7,801,933), which is a continuation of U.S. application Ser. No. 11/328,103, filed Jan. 10, 2006 (now U.S. Pat. No. 7,430,572), which is a continuation of U.S. application Ser. No. 10/880,503, filed Jul. 1, 2004 (now U.S. Pat. No. 7,035,883). This application relates to and claims priority from Japanese Patent Application No. 2004-116069, filed on Apr. 9, 2004. The entirety of the contents and subject matter of all of the above is incorporated herein by reference.

BACKGROUND OF THE INVENTION

1. Field of the Invention

The present invention relates to a storage control system and method for controlling the storage of data to the storage device.

2. Description of the Related Art

In a system handling large amount of data, such as database system in a data center, data is managed using a storage control system that is built separately from the host computer. This storage control system is a disk array system, such as a RAID Redundant Array of Independent/Inexpensive Disks), where many storage devices are enclosed in an array.

In such a storage control system, backup for copying data recorded in the storage device to another storage device is performed so that the data can be recovered even if the data recorded in the storage device become damaged. In this case, consistency of data must be guaranteed during the copying operation, because if the copied data is updated during the copying operation, a mismatch of data occurs, and the backup becomes meaningless.

A method for guaranteeing consistency of the backup data is to stop the program, besides the backup program, that access the data. But in case of a system for which high availability is required, programs cannot be stopped for a long time. Therefore it is necessary to provide a system that creates a stored image of the data at the point of the start of backup without interrupting the programs from updating data during backup. Hereafter the stored image of the data at a certain point in time is called "volume copy", and the method which allows the system to update the data while having the volume copy of a specified point in time is called "volume copy management method". Creating of a volume copy is called "volume copy acquisition", and the data which is the target of volume copy acquisition is called "original data". Stopping the status where the volume copy exists is called "volume copy deletion".

One of the volume copy management methods is by duplicating data.

According to this method, for example, from a normal state where a volume copy is not acquired, a program on the storage control system creates all data on two storage areas (that is, data is duplicated). And the storage control system separates the two storage areas into individual storage areas, provides data existing on one storage area as original data, and provides the data existing on the other storage area as volume copy.

While the volume copy is acquired and duplication is being stopped (non-mirroring state), the storage control system enables update for the storage area of original data, and records the location of data update if a data update is generated. In the case of volume copy deletion, the storage control system restarts the duplication of the data, and copies the update data, of which content does not match between the two storage areas, from the storage area of the original data to the storage area provided as volume copy. This copying is called "mirror resynchronization". In the case of volume copy deletion, the update data may be copied from the storage area of the volume copy to the storage area of the original data, which is the opposite of the above procedure, and such copying is called "reverse mirror resynchronization".

The method of duplicating data by a program on a computer is shown in U.S. Pat. No. 5,051,887, for example.

As the storage device, a disk device (e.g. hard disk drive), magnetic tape storage device, or any other form of physical storage device can be used. Disk devices include high reliability high performance disk devices which are expensive but which have high reliability and performance, and low reliability low performance disk devices which are inexpensive but which have a lower reliability and performance than high reliability high performance disk devices. An example of a high reliability high performance device is a disk device having a fiber channel (hereafter "FC disk device") interface, for which is being standardized by ANSI T11. An example of a low reliability low performance disk device is a disk device having an interface which is different from the interface of a high reliability high performance disk device, such as a disk device having an ATA (AT Attachment) interface (hereafter "ATA disk device"), for which is being standardized by ANSI T13.

In the case of volume copy acquisition, the user may wish to store the original data in the storage area of the FC disk device (hereafter "FC storage area"), but may also wish to store the volume copy on the storage area of the ATA disk device (hereafter "ATA storage area") because of the cost difference.

If the original data on the FC storage area and the volume copy on the ATA storage area are duplicated and used (that is, the FC storage area and the ATA storage area are in a paired status) to meet the above demand, the I/O processing performance (e.g. read or write speed of data) between the storage control system and the host device will drop, for example, when an I/O request (input/output request) is received from the host device to the storage control system and then processed, because the I/O processing performance of the FC disk device becomes equivalent to the ATA disk device. Also the performance of the ATA disk device becomes a bottleneck when the volume copy is acquired or when mirror resynchronization is performed.

Such problems could occur when the attribute levels of the data write destination storage devices, such as performance or reliability, are apart.

SUMMARY OF THE INVENTION

With the foregoing in view, it is an object of the present invention to minimize the influence of a storage device with a low attribute level when storage devices with a different attribute level are used. Specifically, to minimize the drop of processing speed when data is synchronized among a high performance storage device and a low performance storage device, for example.

Other objects of the present invention will be clarified by the description herein below.

A storage control system according to a first aspect of the present invention comprises a plurality of physical storage devices with a different attribute level, a plurality of logical units provided on the plurality of physical storage devices, and a control device for writing data received from an external device to a logical unit selected from the plurality of logical units. The plurality of logical units further comprises one or more high level logical units provided on a physical storage device with a high attribute level and one or more low level logical units provided on a physical storage device with an attribute level lower than the high attribute level. Each of the plurality of logical units further comprises two or more chunks. The plurality of chunks constituting the plurality of logical units further include a plurality of high level chunks constituting the one or more high level logical units and a plurality of low level chunks constituting the one or more low level logical units. At least one of the plurality of high level chunks and at least one of the plurality of low level chunks are pool chunks that can be used dynamically. When data in a first chunk selected from the plurality of chunks is written to a second chunk, the control device selects either a high level chunk or a low level chunk from the plurality of pool chunks based on the status of use of the plurality of chunks, and writes the data in the first chunk to the selected chunk.

The first embodiment of the storage control system according to the first aspect of the present invention further comprises a primary volume further comprising one or more of the high level logical units selected from the plurality of logical units, a secondary volume further comprising one or more of the high level logical units and one or more of the low level logical units selected from the plurality of logical units, and a memory. The plurality of chunks include a plurality of pool chunks and a plurality of allocated chunks. The plurality of allocated chunks include a plurality of primary chunks constituting the primary volume, and a plurality of secondary chunks constituting the secondary volume. The plurality of secondary chunks include a plurality of high level secondary chunks constituting the high level logical unit in the secondary volume, and a plurality of low level secondary chunks constituting the low level logical unit in the secondary volume. The memory stores the correspondence of the primary chunk of the plurality of primary chunks to the high level secondary chunk or the low level secondary chunk. The control device corresponds a new secondary chunk having an attribute level different from the secondary chunk, selected from the plurality of pool chunks, to an original secondary chunk that is corresponded to a primary chunk selected from the plurality of primary chunks, and writes the data in the original secondary chunk to the new secondary chunk, based on the status of use of the plurality of chunks and the information stored in the memory.

The second embodiment of the storage control system according to the first aspect of the present invention is the above mentioned first embodiment, wherein the control device cancels the correspondence of the original secondary chunk and the selected primary chunk after writing the data in the original secondary chunk to the new secondary chunk, and corresponds the new secondary chunk to the selected primary chunk in the memory.

The third embodiment of the storage control system according to the first aspect of the present invention is the above mentioned first embodiment, wherein the operating condition of the plurality of chunks is a ratio of the high level secondary volume or the low level secondary volume in the storage capacity provided by the secondary volume.

The fourth embodiment of the storage control system according to the first aspect of the present invention is the above mentioned third embodiment, wherein when a threshold of a high level ratio, that is a ratio that the plurality of high level secondary chunks occupy in the storage capacity provided by the secondary volume, is recorded in the memory, if the high level ratio is more than the threshold of the high level ratio, the control device preferentially corresponds the low level secondary chunk to the selected original secondary chunk. Or when a threshold of a low level ratio, that is a ratio that the plurality of low level secondary chunks occupy in the storage capacity provided by the secondary volume, is recorded in the memory, if the low level ratio is more than the threshold of the low level ratio, the control device preferentially corresponds the high level secondary chunk to the selected original secondary chunk.

The fifth embodiment of the storage control system according to the first aspect of the present invention is the above mentioned fourth embodiment, wherein when the data update frequency is recorded in the memory for each of the plurality of primary chunks and the low level secondary chunk is preferentially corresponded to the selected primary, the control device preferentially selects the primary chunk of which the data update frequency recorded in the memory is lower, and when the high level secondary chunk is preferentially corresponded to the selected primary chunk, the control device preferentially selects the primary chunk of which the data update frequency is higher.

In the sixth embodiment of the storage control system according to the first aspect of the present invention, when the threshold of the data update frequency of the first chunk is recorded in the memory, the control device corresponds a high level chunk to the first chunk if the data update frequency is more than the threshold of the data update frequency.

The seventh embodiment of the storage control system according to the first aspect of the present invention is the above mentioned first embodiment, wherein when the threshold of the data update frequency of the primary chunk is recorded in the memory, the control device records the data update frequency in the memory for each of the plurality of primary chunks, and corresponds a high level chunk to the low level secondary chunk if the data update frequency of the selected primary chunk is more than the threshold of the data update frequency, and if a low level secondary chunk is corresponded to the selected primary chunk.

In the eighth embodiment of the storage control system according to the first aspect of the present invention, when the threshold of the data update frequency of the first chunk is recorded in the memory, the control device corresponds a low level chunk to the first chunk if the data update frequency is less than the threshold of the data update frequency.

The ninth embodiment of the storage control system according to the first aspect of the present invention is the above mentioned first embodiment, wherein when the threshold of the data update frequency of the primary chunk is recorded in the memory, the control device records the data update frequency in the memory for each of the plurality of primary chunks, and corresponds a high level chunk to the low level secondary chunk if the data update frequency of the selected primary chunk is more than the threshold of the data update frequency, and if a low level secondary chunk is corresponded to the selected primary chunk.

The tenth embodiment of the storage control system according to the first aspect of the present invention is the above mentioned first embodiment, wherein when a new primary volume, which is the same as the primary volume, is generated, the control device corresponds a high level chunk selected from the plurality of pool chunks to the low level secondary chunk if it is judged from the memory that the low level secondary chunk is corresponded to at least one of the plurality of primary chunks, writes the data in the low level secondary chunk to the corresponded high level chunk, and sets each of a plurality of high level chunks, comprised of the corresponded high level chunk and one or more high level secondary chunks corresponded to one or more primary chunks of the plurality of primary chunks, in the memory as primary chunks.

A storage control method according to a second aspect of the present invention is a storage control method for a storage control system comprising a plurality of physical storage devices with a different attribute level, and a plurality of logical units provided on the plurality of physical storage devices. The plurality of logical units further comprises one or more high level logical units provided on a physical storage device with a high attribute level, and one or more low level logical units provided on a physical storage device with an attribute level lower than the high attribute level. Each of the plurality of logical units further comprises two or more chunks. The plurality of chunks constituting the plurality of logical units further comprise a plurality of high level chunks constituting the one or more high level logical units, and a plurality of low level chunks constituting the one or more low level logical units. At least one of the plurality of high level chunks and at least one of the plurality of low level chunks are pool chunks that can be dynamically corresponded. The storage control method comprises steps of selecting either a high level chunk or a low level chunk from the plurality of pool chunks based on the operating condition of the plurality of chunks when data in a first chunk selected from the plurality of chunks is written to a second chunk, and Writing the data in the first chunk to the selected chunk.

The first embodiment of the storage control method according to the second aspect of the present invention is the storage control system further comprising a primary volume further comprising one or more of the high level logical units selected from the plurality of logical units, and a secondary volume further comprising one or more of the high level logical units and one or more of the low level logical units selected from the plurality of logical units. The plurality of chunks include a plurality of pool chunks and a plurality of allocated chunks. The plurality of allocated chunks include a plurality of primary chunks constituting the primary volume, and a plurality of secondary chunks constituting the secondary volume. The plurality of secondary chunks include a plurality of high level secondary chunks constituting the high level logical unit in the secondary volume, and a plurality of low level secondary chunks constituting the low level logical unit in the secondary volume. The storage control method comprises steps of corresponding a new secondary chunk having an attribute level different from the secondary chunk, selected from the plurality of pool chunks, to an original secondary chunk that is corresponded to a primary chunk selected from the plurality of primary chunks, based on a memory that stores the correspondence of a primary chunk of the plurality of primary chunks and the high level secondary chunk or the low level secondary chunk, and the operating condition of the plurality of chunks, and writing the data in the original secondary chunk to the new secondary chunk.

The second embodiment of the storage control method according to the second aspect of the present invention is the above mentioned first embodiment, wherein the storage control method further comprises steps of canceling the correspondence of the original secondary chunk and the selected primary chunk after writing the data in the original secondary chunk to the new secondary chunk, and corresponding the new secondary chunk to the selected primary chunk in the memory.

The third embodiment of the storage control method according to the second aspect of the present invention is the above mentioned first embodiment, wherein the operating condition of the plurality of chunks is a ratio of the high level secondary volume or the low level secondary volume in the storage capacity provided by the secondary volume.

The fourth embodiment of the storage control method according to the second aspect of the present invention is the storage control method further comprising a step of corresponding a high level chunk to the first chunk if the data update frequency is more than the threshold of the data update frequency when the threshold of the data update frequency of the first chunk is recorded in the memory.

The fifth embodiment of the storage control method according to the second aspect of the present invention is the above mentioned first embodiment, wherein the storage control method further comprises steps of recording the data update frequency in the memory for each of the plurality of primary chunks when the threshold of the data update frequency of the primary chunk is recorded in the memory, and corresponding a high level chunk to the low level secondary chunk if the data update frequency of the selected primary chunk is more than the threshold of the data update frequency, and if a low level secondary chunk is corresponded to the selected primary chunk.

The sixth embodiment of the storage control method according to the second aspect of the present invention is the storage control method further comprising a step of corresponding a low level chunk to the first chunk if the data update frequency is less than the threshold of the data update frequency when the threshold of the data update frequency of the first chunk is recorded in the memory.

The seventh embodiment of the storage control method according to the second aspect of the present invention is the above mentioned first embodiment, wherein the storage control method further comprises steps of recording the data update frequency to each of a plurality of primary chunks when the threshold of the data update frequency of the primary chunk is recorded in the memory, and corresponding a high level chunk to the low level secondary chunk if the data update frequency of the selected primary chunk is more than the threshold of the data update frequency, and if a low level secondary chunk is corresponded to the selected primary chunk.

The eighth embodiment of the storage control method according to the second aspect of the present invention is the storage method further comprising steps of deciding that the low level secondary chunk is corresponded to at least one of the plurality of primary chunks when a new primary volume, which is the same as the above mentioned primary volume, is generated, corresponding a high level chunk selected from the plurality of pool chunks to the low level secondary chunk, writing data in the low level secondary chunk to the corresponded high level chunk, and setting each of the plurality of high level chunks, comprised of the corresponded high level chunk and one or more high level secondary chunks which are corresponded to each of one or more primary chunks out of the plurality of primary chunks, in the memory as a primary chunk.

The above mentioned storage control method can be implemented in a single storage control system, for example, or on a network where a plurality of computers are connected. The above mentioned memory may be a single memory, for example, or a plurality of memories. In the case of a plurality of memories, the memories may be distributed.

BRIEF DESCRIPTION OF THE DRAWINGS

FIG. 2 shows a configuration example of a storage control system according to an embodiment of the present invention;

FIG. 4 shows a configuration example of a volume copy management table;

FIG. 5 shows a configuration example of a setup value table 307;

FIG. 6 shows a configuration example of a failure handling volume copy management table;

FIG. 12 are tables for describing the flow of information to be registered in the volume copy management table 308 in the processing flow shown in FIG. 7;

FIG. 13 are tables showing an example of the failure handling volume copy management table 306 before update and after update.

DESCRIPTION OF THE PREFERRED EMBODIMENTS

An embodiment of the present invention will now be described with reference to the drawings.

Figure 1A:
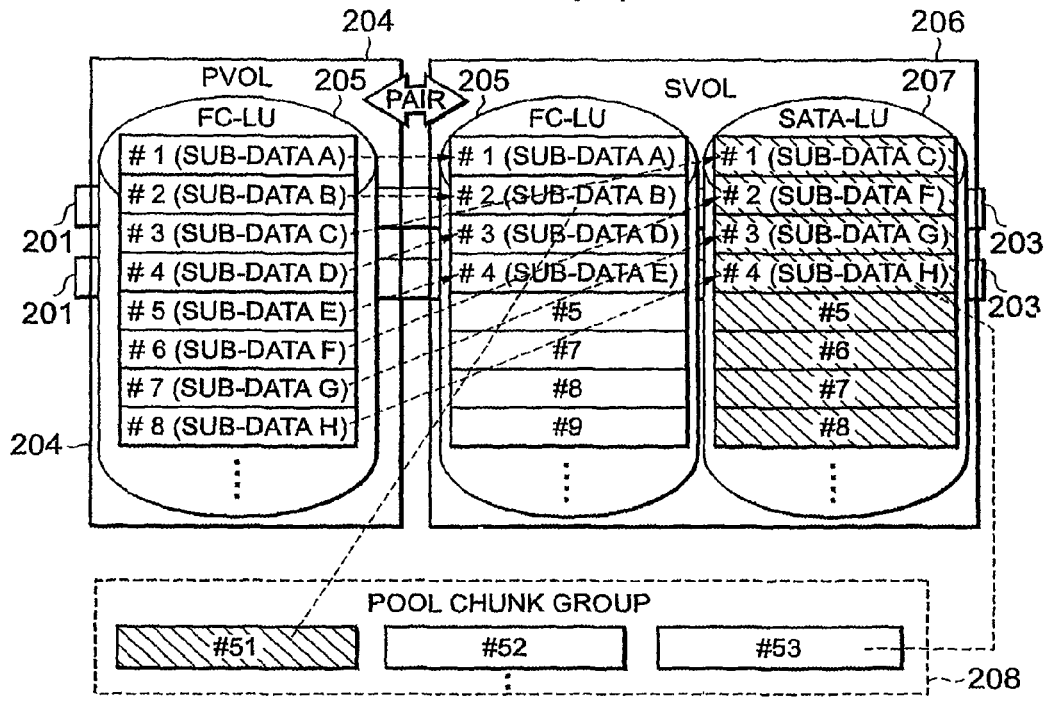
FIG. 1 is a diagram depicting the concept of an embodiment of the present invention.
Figure 1B:
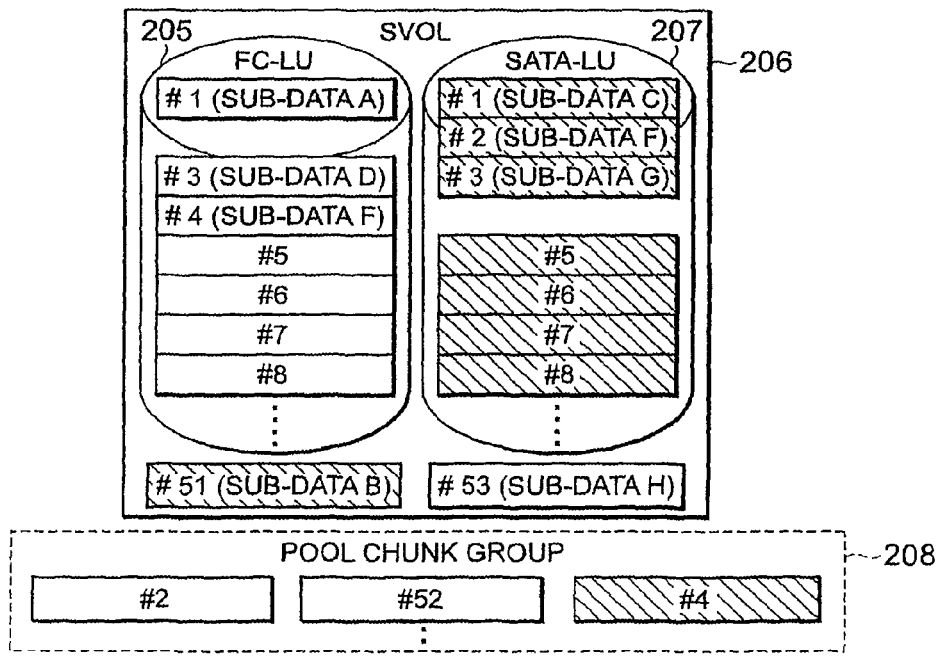

FIG. 1 is a diagram depicting the concept of the present embodiment. The concept of the present embodiment will be described first with reference to FIG. 1.

As FIG. 1 (A) shows, in the present embodiment, a plurality of storage devices, where the attribute level of at least one of reliability and performance is different, coexist. In the plurality of storage devices, one or more fiber channel disk devices (hereafter "FC disk device") 201, which are high reliability high performance disk devices, for example, are included as storage devices with a high attribute level. Also as a storage device with a low attribute level, one or more serial ATA disk devices (hereafter "SATA disk device") 203, which have a low reliability low performance but which are less expensive than the FC disk device 201, are included. In the present embodiment, "reliability" refers to durability which can hold data without damage and to probability of failure which may occur, and specifically to MTBF (Mean Time Between Failure). "Performance" refers to the value of the data transfer rate and the speed of response.

A plurality of logical units (hereafter LU) are disposed on one or more FC disk devices 201 and on one or more SATA disk devices 203. Each LU is comprised of a plurality of same sized sub-LUs (hereafter called chunks). And hereafter the LU 205 disposed on the FC disk device 201 is called "FC-LU", and the LU 207 disposed on the SATA disk device 203 is called "SATA-LU". The chunk constituting the FC-LU 205 is called "FC-chunk", and the chunk constituting the FC-LU 206 is called "SATA-chunk". In FIG. 1, the FC-chunk is indicated by a blank frame, and the SATA-chunk is indicated by a hatched frame.

In the present embodiment, one virtual LU is comprised of one or more LUs. A virtual LU is also called a "logical volume". In the present embodiment, a virtual LU is either a primary volume (hereafter PVOL) 204 or a secondary volume (hereafter SVOL) 206, for example. The PVOL 204 is comprised of one or more FC-LUs 205. The SVOL 206, on the other hand, may be comprised of only one or more FC-LUs 205 or only one or more SATA-LUs 207, or a combination of FC-LU 205 and SATA-LU 207. Hereafter the FC-LU 205 constituting the PVOL 204 is called the "PVOL-FC-LU 205", and the FC-chunk constituting the PVOL 204 is called the "PVOL-FC-chunk". The FC-LU 205 constituting the SVOL 206 is called the "SVOL-FC-LU 205", the SATA-LU 207 constituting the SVOL 206 is called the "SVOL-SATA-LU-207", the FC-chunk constituting the SVOL 206 is called the "SVOL-FC-chunk", and the SATA-chunk constituting the SVOL 206 is called the "SVOL-SATA-chunk". The SVOL-FC-chunk and the SVOL-SATA-chunk may commonly be called the "SVOL-chunk".

In the present embodiment, the storage control program can perform management by duplicating of PVOL 204 and SVOL 206, and in this case, when the data from the host device is written to the PVOL 204, for example, the same data can be written to the SVOL 206. Specifically, in the storage control system, the PVOL-FC-chunk and the SVOL-FC-chunk or the SVOL-SATA-chunk are duplicated and managed, and when sub-data (one composing element of data) is written to a PVOL-FC-chunk, the same sub-data is also written to the duplicated SVOL-FC-chunk or SVOL-SATA-chunk. Hereafter storing the same data to the PVOL 204 and the SVOL 206 is called "mirroring", a pair of PVOL 204 and SVOL 206 is called a "volume pair", and a pair of PVOL-FC-chunk and SVOL-FC-chunk or SVOL-SATA-chunk is called a "chunk pair".

In the present embodiment, other than the PVOL-FC-chunk, SVOL-FC-chunk and SVOL-SATA-chunk, a pool chunk group 208, comprised of a plurality of pool chunks which belong to neither PVOL 204 nor SVOL 206, exists. The plurality of pool chunks constituting the pool chunk group 208 includes a "pool-FC-chunk" which is an FC-chunk, and a "pool-SATA-chunk" which is an SATA-chunk. The storage control system selects a pool chunk from the pool chunk group 208, allocates it to an SVOL-chunk, copies the sub-data in the SVOL-chunk to the selected pool chunk, sets the pool chunk as SVOL-chunk, and sets the SVOL-chunk, which is the copy source of the sub-data, as a pool chunk, so as to exchange the pool chunk and SVOL-chunk. Allocation of pool chunks to the SVOL-chunk can be determined depending on variety of policy, for example, the update frequency of sub-data in the PVOL-chunk which is chunk pair partner of the SVOL-chunk.

Specifically, in the case when the PVOL-FC-chunk "#2" and SVOL-FC-chunk "2" form a chunk pair, as shown in FIG. 1 (A), for example, if it is detected that the update frequency of the sub-data in the PVOL-FC-chunk "#2" is lower than a predetermined threshold, the storage control system selects a pool SATA-chunk (e.g. #51") from the pool chunk group 208, and copies the sub-data B in the SVOL-FC-chunk "#2" to the selected pool SATA-chunk "#51". And, as shown in FIG. 1 (B), the storage control system sets the pool SATA-chunk "#51" as SVOL-FC-chunk "#51" instead of SVOL-FC chunk "#2", and sets the SVOL-FC-chunk "#2" as the pool SATA-chunk "#2" instead of the pool SATA-chunk "#51". In this way, if it is detected that the chunk pair partner of PVOL-FC-chunk, of which update frequency of the sub-data is lower than the predetermined threshold, is the SVOL-FC-chunk, then the chunk pair partner of the PVOL-FC-chunk is switched from the SVOL-FC-chunk to the pool SATA-chunk (after swap, the pool SATA-chunk becomes the SVOL-SATA-chunk).

Also, in the case when PVOL-FC-chunk "#8" and SVOL-SATA-chunk "#4" form a chunk pair, as shown in FIG. 1 (A), for example, if it is detected that the update frequency of the sub-data in PVOL-FC-chunk "#8" is higher than the predetermined threshold, the storage control system selects the pool FC-chunk (e.g. "#53") from the pool chunk group 208, and copies the sub-data H in the SVOL-SATA-chunk "#4" to the selected pool FC-chunk "#53". And the storage control system sets the pool FC-chunk "#53" as SVOL-FC-chunk "#53" instead of SVOL-SATA-chunk "#4", and sets the SVOL-SATA-chunk "#4" as the pool SATA-chunk "#4" instead of the pool FC-chunk "#53". In this way, when it is detected that the chunk pair partner of the PVOL-FC-chunk, of which the update frequency of the sub-data is higher than the predetermined threshold, is the SVOL-SATA chunk, then the chunk pair partner of the PVOL-FC-chunk is switched from the SVOL-SATA-chunk to the pool FC-chunk (after swap, the pool FC-chunk becomes the SVOL-FC-chunk).

The above is the description on the concept of the present embodiment. In the description herein below, it is assumed that one or more FC-LUs 205 constituting the PVOL 204 and one or more FC-LUs 205 and SATA-LU 207 constituting the SVOL 206 exist in a same storage control system, but these may be distributed in a plurality of systems.

Now the present embodiment will be described.

FIG. 2 shows a configuration example of the storage control system according to the present embodiment.

The storage control system 200 is comprised of one or more fiber channel interface devices (hereafter fiber I/F) 290A and 290B (this is not limited to an FC interface device, but may be another interface device). For example, a host device 100, such as a personal computer, may be connected to the fiber I/F 290A, and a backup server 400 having a tape device (e.g. magnetic tape recording device) 500 may be connected to the fiber I/F 290B. The backup server 400 reads data in the SVOL 206 via the fiber I/F 290B, and writes the data to the tape device 500. If the data in the SVOL 206 is updated during backup, data consistency is lost, so the storage control system 200 does not allow backup by the backup server 400 during mirroring. A case of when backup is allowed, for example, is allowing a data update from the host device 100 to the PVOL 204, but not to the SVOL 206, which is a non-mirroring status.

The storage control system 200 comprises a management interface (hereafter management I/F) 240, such as a LAN controller, for example. A management terminal 600, for managing the storage control system 200, is connected to the management I/F 240.

The storage control system 200 is comprised of a plurality of disk devices 201 and 203, a disk controller 250 for controlling the plurality of disk devices 201 and 203, a cache memory 230 for temporarily storing data to be exchanged between an external device (e.g. host device 100) and the disk devices 201 and 203, a CPU 210 for controlling operation of the storage control system 200, and a control memory 220 for storing a computer program to be read by the CPU 210 and such control information as a table which is referred to by the CPU 210.

The plurality of disk devices 201 and 203 include one or more FC disk devices 201 and one or more SATA disk device 203. The one or more FC disk devices 201 has a plurality of FC-LUs 205, as mentioned above. Each FC-LU 205 can be a composing element of the PVOL 204 or can be a composing element of the SVOL 206. The one or more SATA disk devices 203, on the other hand, has one or more SATA-LUs 207, as mentioned above. The SATA-LU 207 can be a composing element of the SVOL 206. In the illustrated example, one FC-LU 205 constitutes the PVOL 204, and one FC-LU 205 and one SATA-LU 207 constitute the SVOL 206.

In the control memory 220, a basic control program 301, volume copy acquisition program 302, update frequency threshold swap program 303, disk usage ratio swap program 304, failure swap program 305, volume copy LU registration table 309, volume copy management table 308, setup value table 307, failure handling volume copy management table 306 and LU management table 911 are stored.

The basic control program 301 is a computer program for controlling the basic operation of the storage control system 200. For example, the basic control program 301 reads data from the LU 205 and 206A or 206B according to the I/O request from the host device 100, and sends it to the host device 100 via the cache memory 230, or stores the data included in the I/O request in the first LU 205.

The volume copy acquisition program 302 is a computer program for executing volume copy acquisition.

The update frequency threshold swap program 303 selects the type of chunk (in other words, either pool FC-chunk or pool SATA-chunk) to be the data swap partner of the SVOL-chunk corresponded to the PVOL-FC chunk, based on whether the update frequency of the PVOL-FC chunk is over the predetermined update frequency threshold.

The disk usage ratio swap program 304 selects the type of chunk (in other words, either pool FC-chunk or pool SATA-chunk) to be the copy destination of the sub-data of the SVOL-chunk, based on whether the ratio of the SVOL-FC-chunk (or SVOL-SATA-chunk) in the SVOL 206 is over the predetermined ratio.

The failure swap program 305 switches the SVOL-FC-chunk corresponding to the PVOL-FC-chunk to the PVOL-FC chunk when a failure occurs to the PVOL 204 (e.g. when the FC disk device having the PVOL-FC-LU is damaged). When failure occurs to the PVOL 204 and if the SVOL-SATA-chunk corresponding to the PVOL-FC-chunk exists in the SVOL 207, the failure swap program 305 moves the sub-data in the SVOL-SATA-chunk to the pool FC-chunk selected from the pool chunk group 208, and switches the pool FC-chunk to the PVOL-FC-chunk. In this way, when failure occurs to the PVOL 204, the failure swap program 305 constructs a new PVOL by the SVOL-FC-chunk corresponding to the PVOL-FC-chunk and the pool FC-chunk allocated to the SVOL-SATA-chunk corresponding to the PVOL-FC-chunk.

Now each table 309-306 and 911, which are stored in the control memory 220, will be described with reference to FIG. 3 to FIG. 6.

Figure 3:
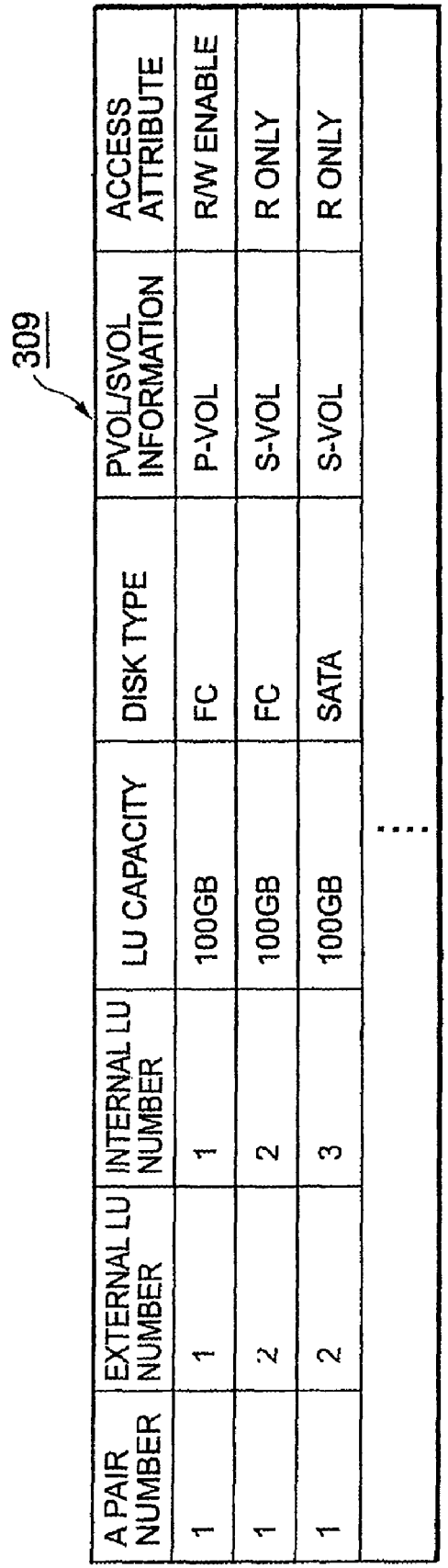
FIG. 3 shows a configuration example of the volume copy LU registration table 309.

FIG. 3 shows a configuration example of the volume copy LU registration table 309.

The volume copy LU registration table 309 is a table where the information on a plurality of LUs in the storage control system 200 is registered. Specifically, in the volume copy LU registration table 309, a pair number, external LU number, internal LU number, LU capacity, disk type, PVOL/SVOL information and access attribute are registered for each of the plurality of LUs.

The pair number is an identification number of the volume pair.

The external LU number is an LU number received from an external device, such as a host device. When two or more LUs are provided to the external device as one logical volume, the external LU number becomes a same number for these two or more LUs. In the case of this example, if "2" is specified from the external device as an LU number, the LU with the internal LU number "2" and the LU with the internal LU number "3" are provided to the external device as one SVOL 206.

The internal LU number is an LU number which the storage control system 200 recognizes and manages. In this embodiment, the LU with the internal LU number "1", for example, is PVOL-FC-LU 205, and the LU with the internal LU number "2" is SVOL-FC-LU 205, and the LU with the internal LU number "3" is SVOL-SATA-LU 207.

The LU capacity is a storage capacity of an LU.

The disk type is a type of disk device which has the corresponding LU (e.g. interface). Specifically, a disk type indicates either an FC disk device or an SATA disk device.

PVOL/SVOL information is information to indicate whether the corresponding LU constitutes a PVOL or an SVOL.

The access attribute is information to indicate what kind of access is enabled to the corresponding LU. For example, "R/W enable" indicates that both read and write are enabled, "R only" indicates that read is enabled but that write is disabled, "W only" indicates that write is enabled but that read is disabled, and "R/W disable", which is not shown in the drawing, indicates that both read and write are disabled. Various types can be used for the access attribute.

Figure 14:
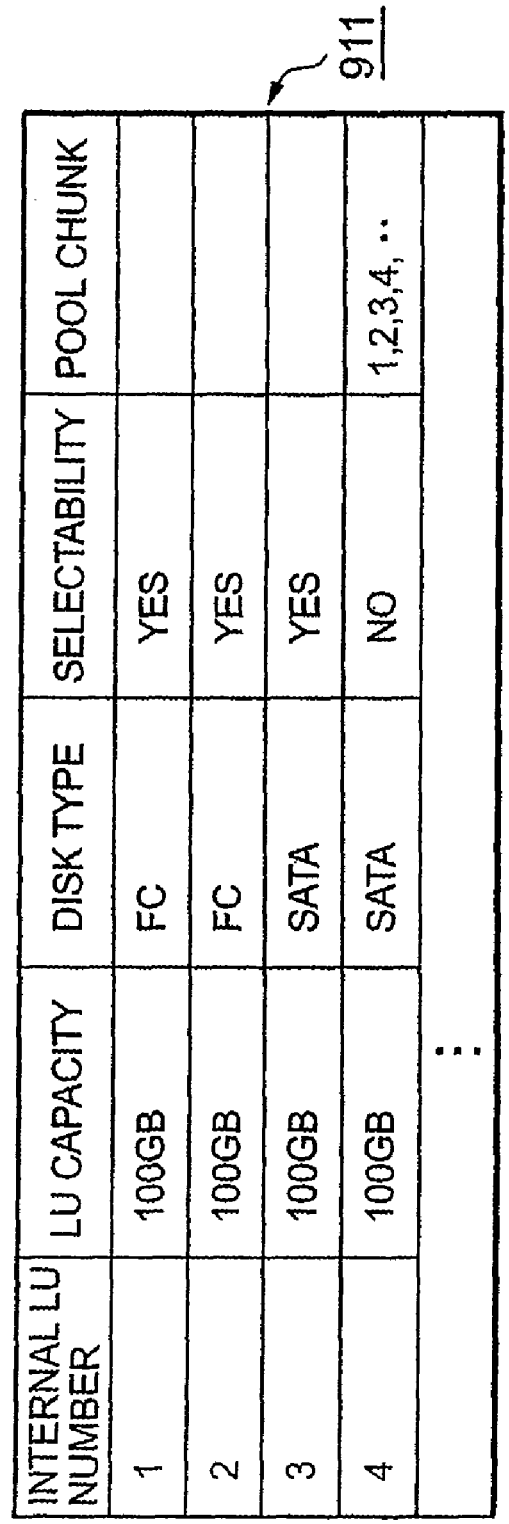
FIG. 14 shows a configuration example of the LU management table 911.

FIG. 14 shows a configuration example of the LU management table 911.

In the LU management table 911, a plurality of LU information items, corresponding to the plurality of LUs existing in the storage control system 200 respectively, is registered. The LU information includes such LU information elements as the internal LU # (number), LU capacity, disk type, selectability information and pool chunk #. Here the selectability information is information that indicates if the LU can be selected or not when a volume copy pair is being set ("volume copy" is a stored image of data at a certain point of time). The pool chunk # is a number assigned to a chunk for which the kind of chunk and how the chunk will be used is not defined, and which can be dynamically allocated (therefore it is a pool chunk).

FIG. 4 is a configuration example of a volume copy management table.

The volume copy management table 308 is a table for managing original data and information on volume copy. The volume copy management table 308 is largely divided into a left column, middle column and right column.

In the left column, information on PVOL 204, which stores original data, is registered. Specifically, in the left column, the LU #, chunk # and update frequency, for example, are registered for each chunk constituting the PVOL 204. The LU # is an internal LU number of an LU which has a corresponding chunk, and is registered as a PVOL. The chunk # is a serial number of the chunk assigned within an LU. For example, the minimum value of a chunk # is 1, and the maximum value of a chunk # is a value of the quotient obtained when the LU capacity of an LU having a corresponding chunk is divided by the chunk size (the quotient is rounded up if a remainder is generated). The update frequency is a number of times when the sub-data stored in the corresponding chunk is updated, and the initial value is 0. The update frequency is incremented or reset by the CPU 210, for example.

In the middle column, information on an SVOL 206 for storing the volume copy is registered. Specifically, in the middle column, a disk type, LU # and chunk #, for example, are registered for each chunk constituting an SVOL 206. The disk type is a type of disk device (e.g. interface type) which has an LU having a corresponding chunk. The LU # is an internal LU number of an LU which has a corresponding chunk, and is registered as an SVOL. The chunk # is a serial number of the chunk assigned within the LU. Each row in this middle column corresponds to each row of the left column. In other words, information on a PVOL-FC-chunk is registered in the rows of the left column, and in each row of the middle column, information on an SVOL-chunk (specifically, either an SVOL-FC-chunk or an SVOL-SATA-chunk) is registered.

In the right column, information on a swap partner chunk is registered. Here "swap partner chunk" is a chunk to be the swap destination (in other words the shift destination) of the sub-data in the corresponding SVOL-chunk. In this right column, the disk type, LU# and chunk # are registered for each swap partner chunk. As a swap partner chunk, a pool chunk, which has not yet been decided how to be used as a chunk, can be allocated. A blank means that an SVOL-chunk has no swap partner chunk.

The CPU 210 refers to this volume copy management table 308, and can identify the following. For example, the CPU 210 can identify that an FC-chunk with LU # "2" and chunk # "1" is corresponded to the PVOL-FC-chunk with LU # "1" and chunk # "1" as an SVOL chunk. And the CPU 210 can also identify that a pool SATA-chunk with LU # "3" and chunk # "5" is corresponded to the SVOL-chunk as the swap partner chunk.

The above is a configuration example of the volume copy management table 308. In the volume copy management table 308, a plurality of SVOL-chunks may be corresponded to one PVOL-FC-chunk, or a plurality of swap partner chunks may be corresponded to one SVOL-chunk.

FIG. 5 shows a configuration example of the setup value table 307.

In the setup value table 307, information can be input and registered from the management terminal 600, for example. The chunk size, swap period, update frequency threshold and disk ratio threshold, for example, are registered in the setup value table 307.

The chunk size is a value for driving an LU into a certain number of byte units to be chunks. The swap period is a value for indicating the schedule to swap the data stored in an SVOL-chunk with a pool FC-chunk or pool SATA-chunk, based on the update frequency threshold or disk ratio threshold (e.g. "weekly" if this is to be done once every week).

The update frequency threshold is a threshold for deciding whether the sub-data in an SVOL-chunk corresponding to a PVOL-FC-chunk is stored in a pool chunk. This update frequency threshold is a value to be compared with the number of times sub-data in a PVOL-FC-chunk was updated during the above mentioned swap period (that is, the update frequency recorded in the volume copy management table 308) by the write command from an external device.

The disk ratio threshold is a threshold of the ratio of the storage capacity created by one or more SVOL-FC-chunks (hereafter SVOL-FC storage capacity) in an entire SVOL 206. Specifically, if the disk ratio threshold is "0.3", for example, the SVOL-FC storage capacity is 0.3 (that is 30%) in an entire SVOL 206, which means that the storage capacity created by one or more SVOL-SATA-chunks (hereafter SVOL-SATA storage capacity) is the remaining 0.7 (that is 70%) in an entire SVOL 206.

A plurality of setup value tables corresponding to the plurality of pair numbers (that is a plurality of volume pairs) may be provided. In this case, the CPU 210 of the storage control system 200 may perform management referring to the setup value tables corresponding to each pair number.

This increases flexibility of management.

FIG. 6 shows a configuration example of a failure handling volume copy management table.

The failure handling volume copy management table 306 is a table for managing which FC-chunk, corresponding to each PVOL-FC chunk in a PVOL 204, is switched to a PVOL-FCchunk when a failure occurred to the PVOL 204. The failure handling volume copy management table 306 is largely divided into a left column, middle column and right column, just like the volume copy management table 308. The left column has the same configuration of the left column of the volume copy management table 308, except that the update frequency is not registered in this case. The middle column has the same configuration as the middle column of the volume copy management table 308.

In the right column, information on the failure handling shift destination chunk is registered. Here "failure handling shift destination chunk" is a chunk selected from the pool chunk group 208 as a shift destination of the sub-data in an SVOL-chunk. In the right column, the disk type, LU # and chunk # are registered for each failure handling shift destination chunk. As FIG. 6 shows, the failure handling shift destination chunk is an FC-chunk in the present embodiment, and the SVOL-chunk corresponded to the failure handling shift destination chunk is an SVOL-SATA chunk. By this, when a failure occurs in a PVOL 204, and if a copy of the sub-data in the PVOL-FC-chunk exists in the SVOL-SATA-chunk, the sub-data in the SVOL-SATA-chunk is shifted to the FC-chunk corresponded to the SVOL-SATA-chunk (that is, an open chunk on the FC disk device, which is a high reliability high performance disk device). A blank indicates that a failure handling shift destination chunk in an SVOL-chunk is not corresponded.

The above is the description on each table 309-306 and 911 which are stored in the control memory 220.

Now the processing flow to be executed in the present embodiment will be described below with reference to the above mentioned tables 309-306 and 911.

Figure 7:
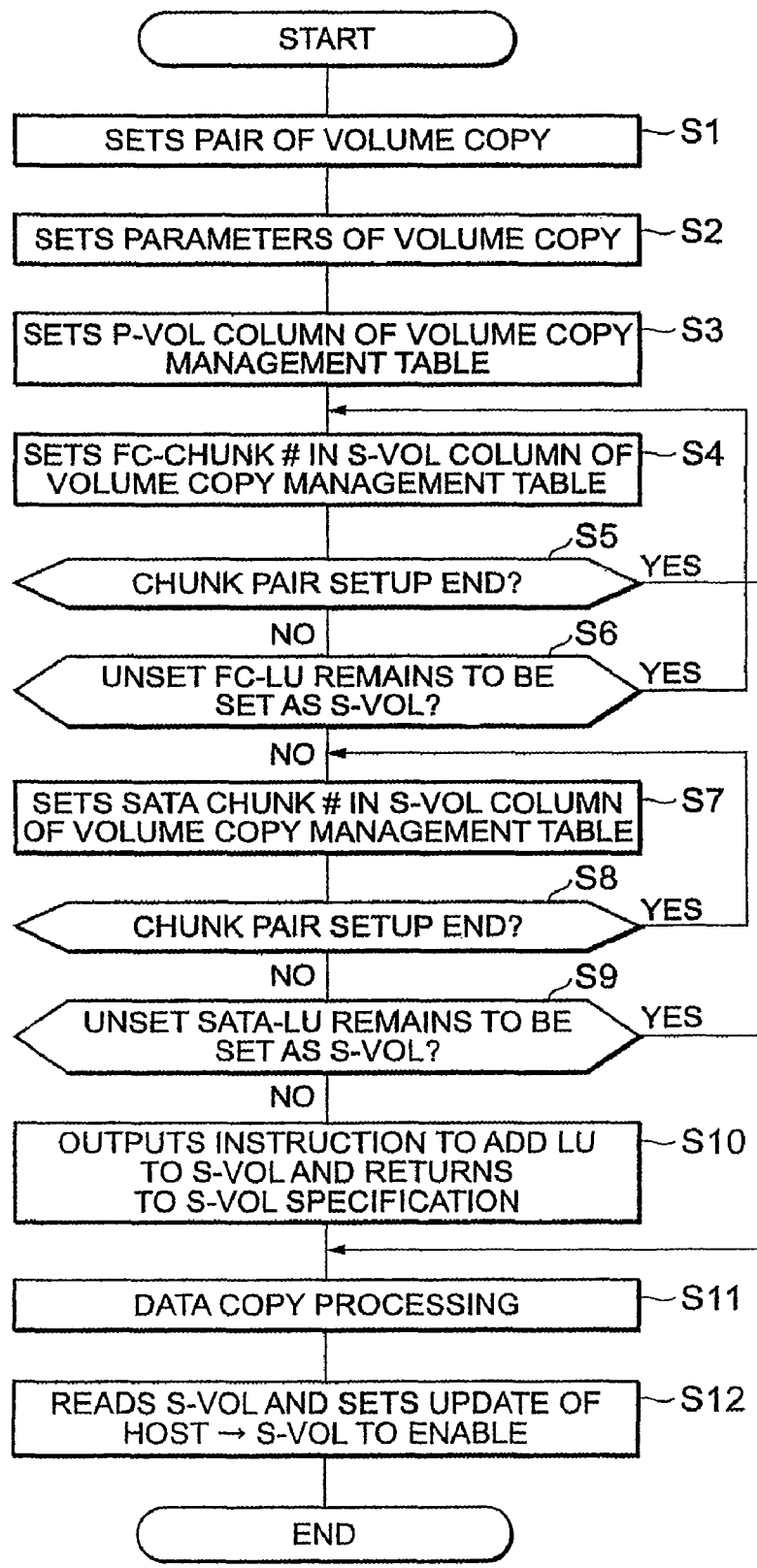
FIG. 7 shows the processing flow to be executed by the volume copy acquisition program 302.

FIG. 7 shows a processing flow to be executed by the volume copy acquisition program 302 which is read by the CPU 210.

Figure 11:
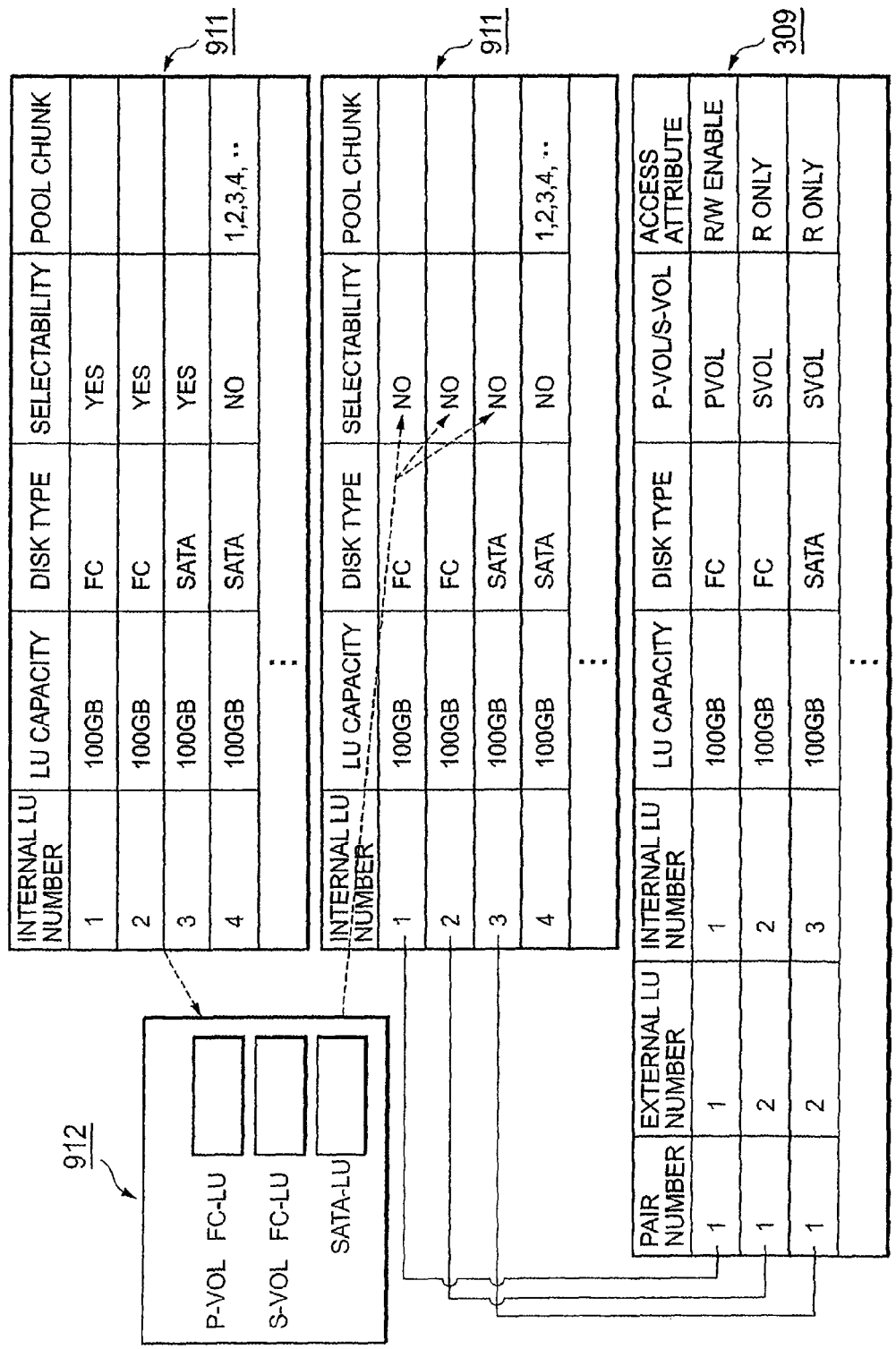
FIG. 11 is a diagram depicting the pair setting of the volume copy which is executed in S1 in FIG. 7.

The volume copy acquisition program 302 sets a pair of volume copy (step S1). In this case, information is registered in the volume copy LU registration table 309 according to the flow shown in FIG. 11, for example.

For example, the volume copy acquisition program 302 displays the copy pair setup screen 912 on the display screen of the management terminal 600. The LU # (internal LU number) of the PVOL-LU constituting the PVOL 204 and the LU # of a plurality of SVOL-LUs (one or more FC-LU and one or more SATA-LU) constituting the SVOL are input in the copy pair setup screen 912. When PVOL-FC-LU (FC-LU constituting the PVOL 204), SVOL-FC-LU (FC-LU constituting the SVOL 206) and SVOL-SATA-LU (SATA-LU constituting the SVOL 206) are selected from the plurality of LUs not registered in the volume copy LU registration table 309 (in other words, LUs which are selectable in the LU management table 911), the respective LU #s are input in this copy pair setup screen 912, and the volume copy acquisition program 302 writes each LU # which was input to the volume copy LU registration table 309. The volume copy acquisition program 302 also acquires other LU information elements (e.g. disk type) corresponding to the LU #, which was input, from the LU management table 911, and writes the acquired LU information elements to the volume copy LU registration table 309. For example, if the internal LU # "1" is input as the PVOL-FC-LU, the internal LU # "2" is input as the SVOL-FC-LU, and the internal LU # "3" is input as the SVOL-SATA-LU, then in the LU management table 911, the volume copy acquisition program 302 switches the selectability information corresponding to each internal LU # "1"-"3" from selectable to unselectable, and constructs the volume copy LU registration table 309 shown in FIG. 3.

Now S2 and later processing will be described with reference again to FIG. 7.

The volume copy acquisition program 302 receives input of the values of the setup value table 307 from the user via the management terminal 600, for example. When various values (that is chunk size, swap period, update frequency threshold and disk ratio threshold) are input, the volume copy acquisition program 302 registers the values, that were input, in the setup value table 307 (S2).

Then the volume copy acquisition program 302 registers the PVOL-FC-chunk in the volume copy management table 308 (S3). A specific example of this processing will be described with reference to FIG. 12 (A). For example, the volume copy acquisition program 302 calculates the number of chunks based on the LU capacity and the chunk size registered in the setup value table 307, for the PVOL-FC-LU which is set in the volume copy LU registration table 309. And the volume copy acquisition program 302 assigns the chunk # as a serial number to the calculated number of chunks respectively, and registers the assigned chunk # and the LU # of the PVOL-FC-LU thereof in the volume copy LU registration table 309. The volume copy acquisition program 302 inputs "0" to the update frequency of each PVOL-FC-chunk as an initial value. When data is updated by a write command from an external device, such as the host device 100, the volume copy acquisition program 302 adds "1" to the update frequency corresponding to the PVOL-FC-chunk for which data was updated.

Then the volume copy acquisition program 302 registers the SVOL-FC-chunk in the volume copy management table 308 (S4). A specific example of this processing will be described with reference to FIG. 12 (B). For example, the volume copy acquisition program 302 calculates the number of chunks of the PVOL-FC-LU and assigns a chunk # to each chunk in a same method as the case of registering the PVOL-FC-chunk, and registers the assigned chunk # and the LU # of the SVOL-FC-LU thereof in the volume copy LU registration table 309.

If an SVOL-chunk was set for all the PVOL-FC-chunks in S4 (Y in S5), the volume copy acquisition program 302 moves to S11 without executing the later mentioned operations in S6-S10.

When the SVOL-chunk is not set for at least one PVOL-FC-chunk, and the SVOL-FC-chunk remains without being corresponded with the PVOL-FC-chunk in S4 (N in S5 and Y in S6), the volume copy acquisition program 302 executes the operation in S4 for the remaining PVOL-FC-chunk.

When the SVOL-chunk is not set for at least one PVOL-FC-chunk and SVOL-FC-chunks do not remain (N in S5 and N in S6) in S4, the volume copy acquisition program 302 calculates the number of chunks for SVOL-SATA-LU and assigns a chunk # to each chunk, just like the case of SVOL-FC-LU, and registers the allocated chunk # and LU # in the volume copy LU registration table 309 (S7). FIG. 12 (C) shows an example of this result.

When the SVOL-chunk is set for all the PVOL-FC-chunks in S7 (Y in S8), the volume copy acquisition program 302 moves to S11 without executing the later mentioned operations in S9-S10.

When the SVOL-chunk is not set for at least one PVOL-chunk and the SVOL-SATA-chunk remains without being corresponded to the PVOL-FC-chunk in S7 (N in S8 and Y in S9), the volume copy acquisition program 302 returns to the beginning of S7.

When the SVOL-chunk is not set for at least one PVOL-FC-chunk and selectable SVOL-SATA-chunk does not remain at S7 (N in S8 and N in S9), the volume copy acquisition program 302 outputs a warning, to add an LU to SVOL, on the management terminal 600, for example (S10), because this means that the number of chunks of SVOL are insufficient.

If data is stored in PVOL after Y in S5 and Y in S8, the volume copy acquisition program 302 judges the correspondence of the chunk of PVOL and the chunk of SVOL referring to the volume copy management table 308, and stores the sub-data in the PVOL-FC-chunk and the SVOL-chunk corresponded thereto (S11). Specifically, the volume copy acquisition program 302 duplicates the sub-data registered in the cache memory 230, stores one sub-data on the cache memory 230 in the PVOL-FC-chunk, and stores the other sub-data on the cache memory 230 in the SVOL-chunk corresponded to that PVOL-FC-chunk.

After S11, the volume copy acquisition program 302 sets the access attribute of each LU constituting the SVOL to R/W enable (enabling both read and write) in the volume copy LU registration table 309 at an arbitrary timing (S12).

In this processing, data may be written to the PVOL by random write access, or data may be written by sequential write access. In the case of random write access, for example, the volume copy acquisition program 302 receives a corresponding write command for each PVOL-FC-chunk, and stores the sub-data to the PVOL-FC-chunk and the SVOL-chunk corresponded thereto each time one write command is processed. In the case of sequential write access, for example, the volume copy acquisition program 302 receives write commands corresponding to a plurality of PVOL-FC-chunks (e.g. all the PVOL-FC-chunks), and when one write command is processed, sub-data is written to the plurality of PVOL-FC-chunks and the plurality of SVOL-chunks corresponding thereto sequentially from a smaller chunk #.

Figure 8:
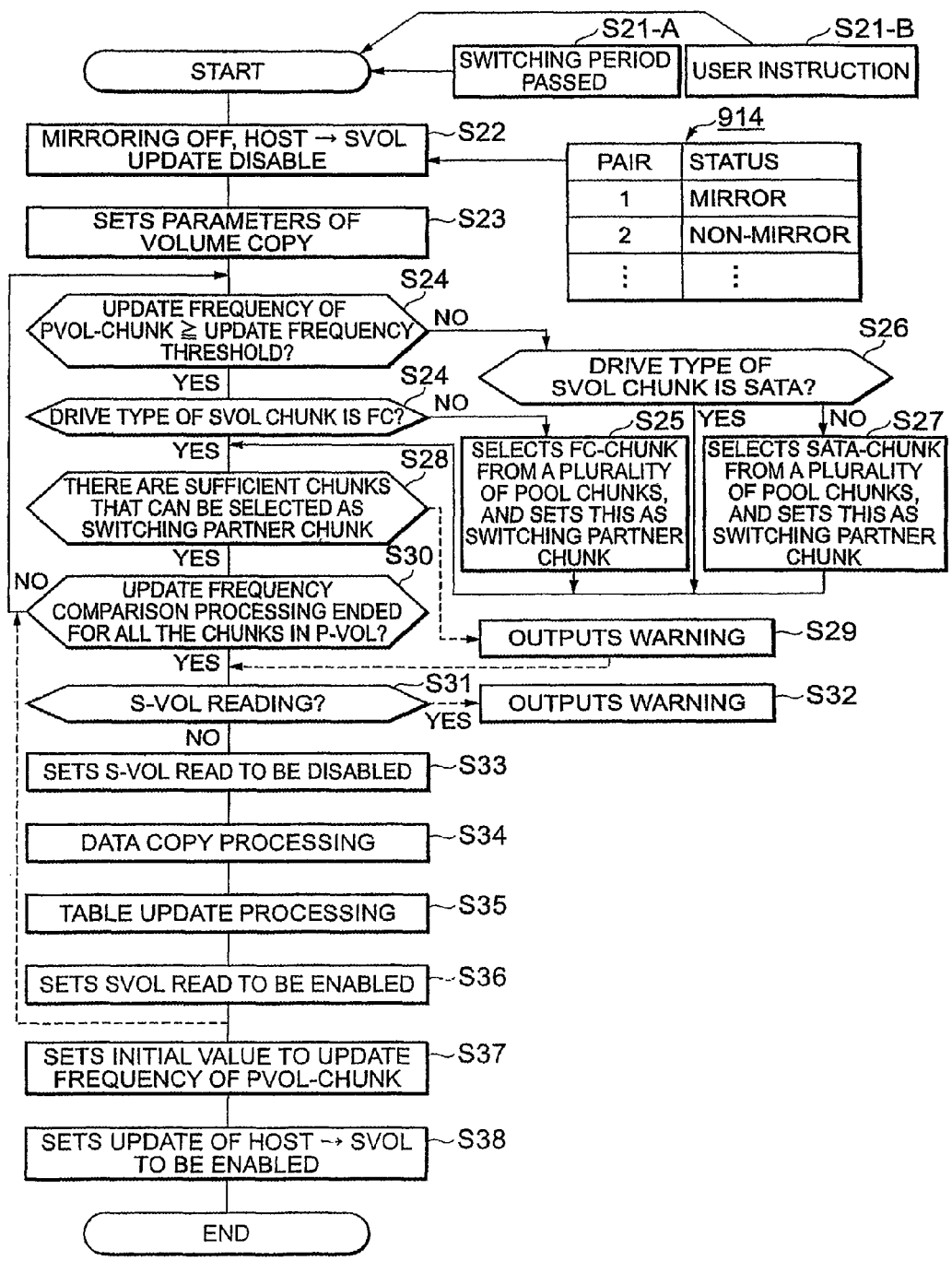
FIG. 8 shows the processing flow to be executed by the update frequency threshold swap program 303.

FIG. 8 shows the processing flow to be executed by the update frequency threshold swap program 303 which is read by the CPU 210.

When the time of the swap period registered in the setup value table 307 comes (S21-A), or when the user inputs a data swap instruction via a predetermined terminal (e.g. management terminal 600 or host device 100) (S21-B), the basic control program 301 starts up the update frequency threshold swap program 303.

When it is detected that the volume pair selected from one or more volume pairs (hereafter target volume pair (s)) are in non-mirror status, the update frequency threshold swap program 303 sets the access attribute of each LU constituting the SVOL of the target volume pair to update disable (e.g. R only) in the volume copy LU registration table 309. When the target volume pair is in mirror status, a warning is output (S22). Whether the target volume pair is non-mirror status or mirror status can be judged by referring to the pair management table 914 (e.g. provided in the control memory 220) in which the status information corresponding to each pair number (information to indicate mirror status or non-mirror status) is registered. Mirror status is a status where data is duplicated. In other words, in this status if data is updated in the PVOL, the same updated data is copied to the SVOL (in other words, the SVOL is synchronized with the PVOL). Non-mirror status is a status where duplication is not being done, in other words, in this status even if data is updated in the PVOL, the updated data is not written to the SVOL (in other words, the SVOL is not synchronized with the PVOL).

The update frequency threshold swap program 303 compares the update frequency of the PVOL-chunk registered in the first row of the volume copy management table 308 and the update frequency threshold registered in the setup value table 307 (S23).

When it is judged that the update frequency of the PVOL-FC-chunk is the update frequency threshold or more (Y in S23) and the SVOL-chunk of the chunk pair partner of the PVOL-FC-chunk is an FC-chunk based on the judgment according to the volume copy management table 308 (Y in S24) in S23, the update frequency threshold swap program 303 advances to the later mentioned S28.

When the update frequency of the PVOL-FC-chunk is the update frequency threshold or more (Y in S23) and the SVOL-chunk corresponding to the PVOL-FC-chunk is not an FC-chunk based on the judgment according to the volume copy management table 308 (N in S24) in S23, the update frequency threshold swap program 303 selects a pool FC-chunk from the plurality of pool chunks, and writes the chunk # and LU # of the selected pool FC-chunk to the right column (column of the swap partner chunk) of the volume copy management table 308 with corresponding to the SVOL-chunk which is not the above FC-chunk (that is, SVOL-SATA-chunk) (S25). By this for the SVOL-SATA-chunk corresponded to the PVOL-FC-chunk of which the update frequency of the sub-data is the update frequency threshold or more, the FC-chunk existing on a high reliability high performance disk device is corresponded as the data swap partner. The chunk # corresponded to the SVOL-SATA-chunk is selected from a plurality of pool chunks, therefore it is a chunk # not registered on the volume copy management table 308.

When the update frequency of the PVOL-FC-chunk is less than the update frequency threshold (N in S23) and the SVOL-chunk corresponding to the PVOL-FC-chunk is an SATA-chunk based on the judgment according to the volume copy management table 308 (Y in S26) in S23, the update frequency threshold swap program 303 advances to the later mentioned S28.

When the update frequency of the PVOL-FC-chunk is less than the update frequency threshold (N in S23) and the SVOL-chunk corresponding to the PVOL-FC-chunk is not an SATA-chunk (N in S26) based on the judgment according to the volume copy management table 308 in S23, the update frequency threshold swap program 303 selects the SATA-chunk from a plurality of pool chunks, and writes the chunk # and LU # of the selected SATA-chunk to the right column (column of the swap partner chunk) of the volume copy management table 308 with corresponding to the SVOL-chunk which is not the above SATA-chunk (that is the SVOL-FC-chunk) (S27). By this, for the SVOL-FC-chunk corresponded to the PVOL-FC-chunk of which the update frequency of the sub-data is less than the update frequency threshold, the SATA-chunk existing on a low reliability low performance but inexpensive disk device is corresponded as the data swap partner.

In the case of Y in S24, Y in S26 and a chunk existing in the swap destination (that is, a selectable pool chunk does not exist) in S25 or S27 (N in S28), the pools of chunks at the swap destination are insufficient, so the update frequency threshold swap program 303 outputs a warning, to have the SVOL add an LU or change the threshold, to the management terminal 600 or host device 100, for example (S29). The later mentioned processings in S31-S36 may be executed without confirming all the chunks. In this case, processing in S22 or later may be executed after these processings.

When the swap destination chunks are sufficient in S28 (Y in S28), the update frequency threshold swap program 303 judges whether the comparison processing of the update frequency and the update frequency threshold has been completed for all the PVOL-FC-chunks (S30).

If there is a PVOL-FC-chunk for which comparison processing has not been executed in S30 (N in S30), the update frequency threshold swap program 303 returns to S23, and executes the processings in S23-S28 for the next PVOL-FC-chunk.

If it is judged that the comparison processing has been completed for all the PVOL-FC-chunks in S30 (Y in S30), the update frequency threshold swap program 303 judges whether data is being read from the SVOL by backup so as to execute processing to swap data in the corresponding copy destination chunk to the swap destination chunk having the chunk # registered in the volume copy management table 308 (S31).

When data is being read from the SVOL in S31 (Y in S31), the update frequency threshold swap program 303 outputs a warning to stop the reading operation, such as backup, or to stop the swap program (S32).

When data is not being read from the SVOL in S31 (N in S31), the update frequency threshold swap program 303 sets the access attribute of each LU constituting the SVOL to read disable (e.g. R/W disabled) (S33).

After S33, the update frequency threshold swap program 303 shifts the sub-data in the SVOL-chunk having a chunk # registered in the middle column (SVOL column) to the swap destination chunk corresponded to the SVOL-chunk based on the volume copy management table 308 (S34). When this completes, the update frequency threshold swap program 303 overwrites the content of the swap destination chunk (disk type, LU # and chunk #) on the content of the SVOL-chunk corresponding to the swap destination chunk in the volume copy management table 308, and deletes the content of the swap destination chunk from the right column (swap partner chunk column) (S35). In this case, the update frequency threshold swap program 303 may register the deleted content of the swap destination chunk (e.g. chunk #) to the LU management table 911, for example, as a content of a pool chunk.

After S35, the update frequency threshold swap program 303 sets the access attribute of each LU constituting the SVOL to read enable (e.g. R only) (S36). After S36, if processing after S31 had been executed without performing the above comparison processing for all the PVOL-FC-chunks, the update frequency threshold swap program 303 returns to S3, as shown by the dotted line.

After S36, the update frequency threshold swap program 303 resets the update frequency of each v on the volume copy management table 308 to the initial value (S37). And the update frequency threshold swap program 303 sets the access attribute of each LU constituting the SVOL to updatable (e.g. R/W enabled) (S38).

The above is the processing flow to be executed by the update frequency threshold swap program 303.

Figure 9:
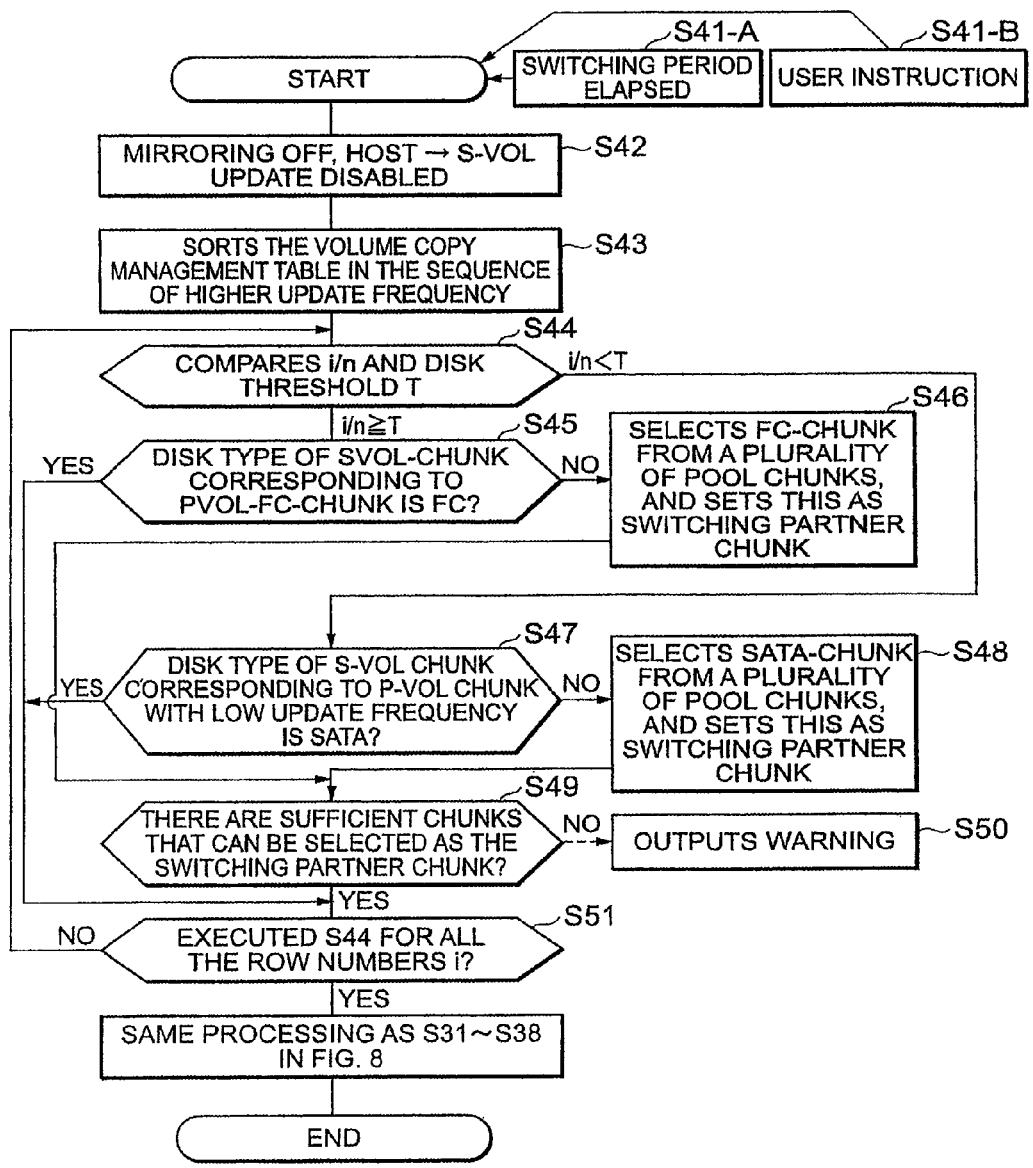
FIG. 9 shows the processing flow to be executed by the disk usage ratio swap program 304.

FIG. 9 shows the processing flow to be executed by the disk usage ratio swap program 304 which is read by the CPU 210.

When the swap period registered in the setup value table 307 comes (S41-A), or when the user inputs a data swap instruction via a predetermined terminal (e.g. management terminal 600 or host device 100) (S41-B), the basic control program 301 starts up the disk usage ratio swap program 304.

The disk usage ratio swap program 304 sets the access attribute of each LU constituting the SVOL of the target volume pair to update disable (e.g. R only) in the volume copy LU registration table 309 with the same method as S22 in FIG. 8 (S42).

Then the disk usage ratio swap program 304 sorts a plurality of rows on the volume copy management table 308 in the descending order of data update frequency (S43). Hereafter the number of rows in the volume copy management table 308 is assumed to be n and the row number after the above sorting is i, and the volume copy management table 308 after the above sorting is P (i). The disk usage ratio swap program 304 executes the following S44 and the later processings in the sequence of lower row number i after the sorting (in other words, starting from the higher data update frequency).

The disk usage ratio swap program 304 selects one row number i from the plurality of row numbers after the above sorting, and compares the value i/n when the selected row number i is divided by the number of rows n and the disk ratio threshold T registered in the setup value table 307 (S44).

When i/n is T or more as a result of S44, the disk usage ratio swap program 304 judges whether the SVOL-chunk corresponding to the PVOL-FC-chunk with the above selected row number i is an FC-chunk or not (S45). In S45, if a positive judgment result is acquired (Y in S45), the disk usage ratio swap program 304 executes the later mentioned processing in S51. If a negative judgment result is acquired in S45 (N in S45), the disk usage ratio swap program 304 selects an FC-chunk from a plurality of pool chunks, and sets the selected FC-chunk in P(i) as a swap partner chunk of the above mentioned corresponded SVOL-chunk (S46). At this time, if a selectable FC-chunk does not exist in the plurality of pool chunks (N in S49), the disk usage ratio swap program 304 outputs a warning, to increase the selectable pool FC-chunks, to the user (S50), and if not executes S51 (Y in S49).

When i/n is less than T as a result of S44, the disk usage ratio swap program 304 judges whether the SVOL-chunk corresponding to the PVOL-FC-chunk with the above mentioned selected row number i is an SATA-chunk or not (S47). In S45, if a positive judgment result is acquired (Y in S47), the disk usage ratio swap program 304 executes the later mentioned processing in S51. If a negative judgment result is acquired in S47 (N in S47), the disk usage ratio swap program 304 selects an SATA-chunk from a plurality of pool chunks, and sets the selected SATA-chunk in P (i) as a swap partner chunk of the above mentioned corresponded SVOL-chunk (S48). At this time, if a selectable SATA-chunk does not exist in the plurality of pool chunks (N in S49), the disk usage ratio swap program 304 outputs a warning, to increase the selectable pool SATA-chunks, to the user (S50), and if not executes S51 (Y in S49).

The disk usage ratio swap program 304 executes the above mentioned processings in S44-S48 for all the row numbers i (N in S51), and when this processing is completed for all the row numbers i (Y in S51), the same processing as S31-S38 in FIG. 8 are executed.

In the above processing flow, if the SVOL-chunk corresponding to the PVOL-FC-chunk is not a chunk with an appropriate attribute level according to the update frequency of the sub-data in the PVOL-FC-chunk, the sub-data in the SVOL-chunk is shifted to another chunk with an appropriate attribute level, and the ratio of the SVOL-FC storage capacity in SVOL 206 (in other words, the ratio of the SVOL-SATA storage capacity) is adjusted to the disk ratio threshold T.

Figure 10:
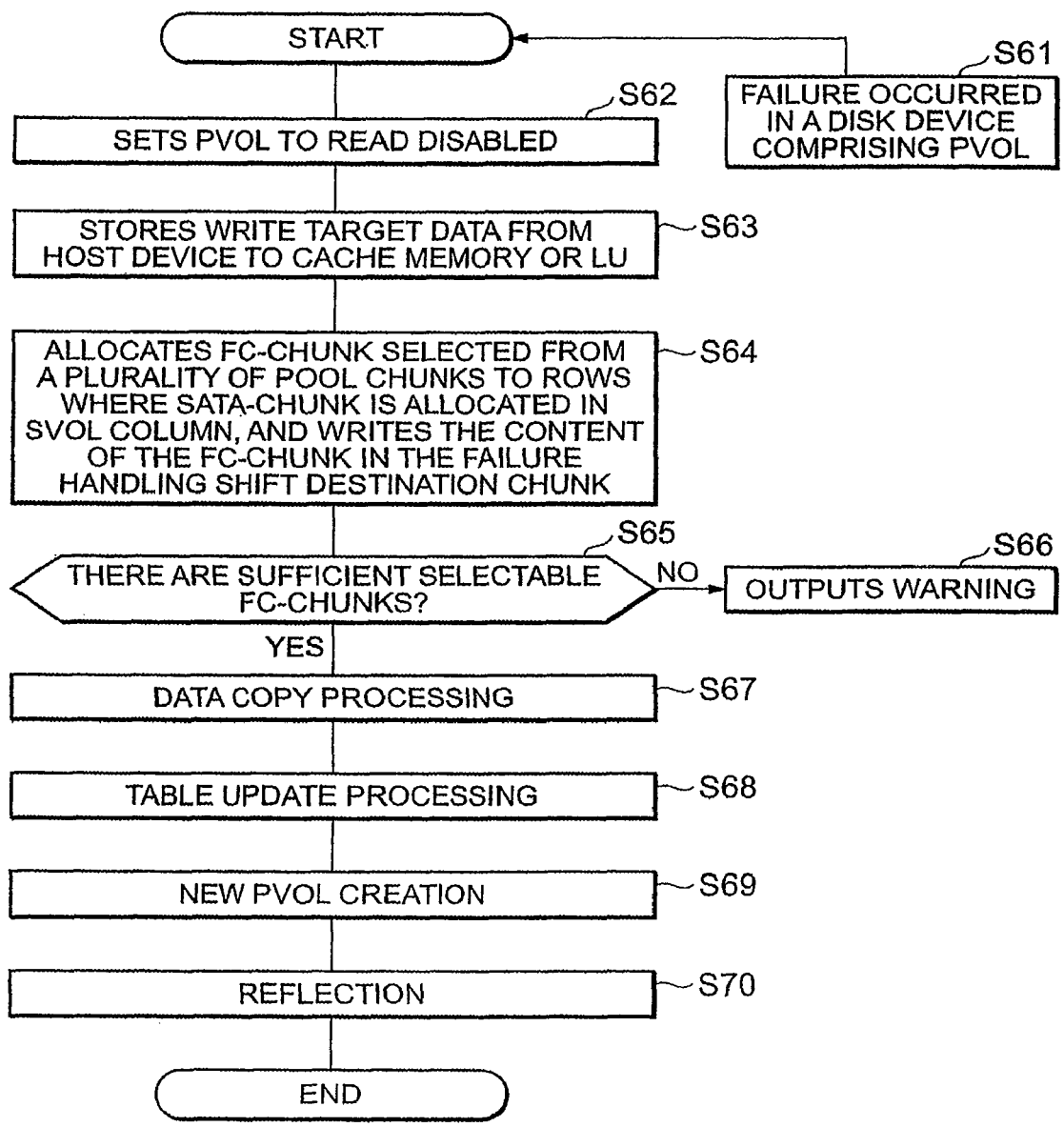
FIG. 10 shows the processing flow to be executed by the failure swap program 305.

FIG. 10 shows the processing flow to be executed by the failure swap program 305 which is read by the CPU 210. In the description below, to make the description simple and clear, the PVOL when failure occurs is called the "original PVOL", the SVOL when failure occurs is called the "original SVOL", and the PVOL and SVOL created by the failure swap program are called the "new PVOL" and the "new SVOL" respectively. Also in the description below, it is assumed that a failure occurred to the original PVOL, while the write data received from the host device 100 is being written to the original PVOL.

When a failure occurs to the original PVOL (S61), the basic control program 301 detects this, and starts up the failure swap program 305.

The failure swap program 305 sets the access attribute of each LU constituting the original PVOL where a failure occurred to read disable (e.g. R/W disable) in the volume copy LU registration table 309 (S62). The failure swap program 305 saves the write data from the host device 100 to the original PVOL in the cache memory 230 or in another LU (S63).

Then the failure swap program 305 selects an FC-chunk out of a plurality of pool chunks, and writes the chunk # and LU # of the selected FC-chunk in the right column of the failure handling management table 306 (failure handling shift destination chunk column) with corresponding to the original SVOL-SATA-chunk (S64). At this time, if there are sufficient allocatable FC-chunks (Y in S65), the failure swap program 305 executes the later mentioned S67, and if no allocatable FC-chunk exists in the plurality of pool chunks, the failure swap program 305 outputs a warning to notify that FC-LU is insufficient (N in S65 and S66).

In S67, the failure swap program 305 shifts the sub-data in the original SVOL-SATA-chunk, having a chunk # registered in the middle column (SVOL column), to the swap destination chunk (FC-chunk) corresponded to that original SVOL-SATA-chunk, based on the failure handling volume copy management table 306 (S67).

Then the failure swap program 305 overwrites the content (LU # and chunk #) of the swap destination chunk on the content of the original PVOL-FC-chunk corresponding to that swap destination chunk in the failure handling volume copy management table 306, and deletes the content of the swap destination chunk. For the original PVOL-FC-chunk where no swap destination chunk exists, the failure swap program 305 overwrites the content (LU# and chunk #) of the original SVOL-FC-chunk on the content of the original PVOL-FC-chunk, and deletes the content of that original SVOL-FC-chunk (S68). If failure occurs to the original PVOL by this processing, the original SVOL-chunk is switched to the new PVOL-chunk if the original SVOL-chunk corresponding to the original PVOL-FC-chunk is an FC-chunk. And if the original SVOL-chunk corresponding to the original PVOL-chunk is an SATA-chunk, then an FC-chunk selected from the plurality of pool chunks is corresponded to that SATA-chunk, and the selected FC-chunk is switched to the new PVOL-chunk. As a result, each of the plurality of original PVOL-chunks registered in the left column (original data column) of the failure handling volume copy management table 306 is switched to the original SVOL-FC-chunk or the above mentioned selected FC-chunk, and a new PVOL comprised of the original SVOL-FC-chunk and the above mentioned selected FC chunk are generated. FIG. 13 (A) shows the status of the failure handling volume copy management table 306 before update, and FIG. 13 (B) shows the status of the table 306 after update.

By this update processing in S68, the plurality of FC-chunks out of the original SVOL-chunks are all switched to new PVOL-FC-chunks, so new SVOL-chunks for this amount of chunks are required. So the failure swap program 305 selects the required number of FC-chunks from the plurality of pool chunks, and registers the selected FC-chunks in the middle column of the failure handling volume copy management table 306 and the volume copy management table 308 as new SVOL-chunks. And the failure swap program 305 copies the data in the FC-chunks, which were original SVOL-chunks, to the new SVOL-chunks (S69).

Then the failure swap program 305 writes the write data saved in S63 to the new PVOL. The failure swap program 305 provides the information on the new PVOL (e.g. external LU number and storage capacity) to the host device 100 when a predetermined inquiry command (e.g. inquiry command based on SCSI protocol) from the host device 100 (S69). By this, the host device 100 can recognize the new PVOL.

The above is the processing flow executed by the failure swap program 305. In the processing in S68, the failure swap program 305 may update the content of the volume copy management table 308 in the same way. The content of the original SVOL-chunk switched to the new PVOL-chunk may be deleted from the failure handling volume copy management table 306 and volume copy management table 308.

According to the above mentioned embodiment, each of the plurality of LUs existing on the storage control system 200 is divided into a plurality of chunks. The PVOL is comprised of only FC-chunks, but an SVOL is comprised of both FC-chunks and SATA-chunks. And to each of the plurality of SVOL-chunks, either an FC-chunk or SATA-chunk selected from the plurality of pool chunks is dynamically corresponded. The type of corresponded chunk is switched depending on the status of data write to the PVOL. Specifically, to the SVOL-SATA-chunk corresponding to the PVOL-FC-chunk with a high data update frequency, for example, an FC-chunk existing on a high reliability high performance FC disk device is corresponded, and to an SVOL-FC-chunk corresponding to a PVOL-FC-chunk with a low data update frequency, a SATA-chunk existing on a low reliability low performance but inexpensive SATA disk device is corresponded. By this, the drop in speed of copy processing by a low reliability low performance disk device and an increase in cost can both be addressed.

According to the above mentioned embodiment, the storage capacity ratio of an SVOL-FC in an SVOL (in other words the SVOL-SATA storage capacity ratio) is automatically adjusted to be a preset disk ratio threshold. Therefore the FC storage capacity ratio in an SVOL becomes the ratio desired by the user, even if the user does not periodically perform complicated settings.

According to the above mentioned embodiment, the storage capacity ratio of an SVOL-FC is adjusted in the sequence of SVOL-chunks corresponding to the PVOL-FC-chunks with a higher update frequency. By this, the storage capacity ratio of an FC is efficiently adjusted.

According to the above mentioned embodiment, when a failure occurs to the original PVOL, even if the chunk corresponded to the original PVOL-chunk is an SATA-chunk, the data in the SATA-chunk is shifted to the FC-chunk selected from the plurality of pool chunks, and the FC-chunk is switched to the new PVOL-chunk. By this, the new PVOL-chunk constituting the new PVOL can be an FC-chunk regardless the type of chunk corresponded to the original PVOL-chunk.

An embodiment of the present invention was described above, but this is just an example in order to describe the present invention, and it is not intended to limit the scope of the present invention to only this embodiment. The present invention can be implemented by various other embodiments. For example, the above embodiment can be applied to a storage device with an attribute level other than reliability or performance. The above embodiment can be applied even when a plurality of LUs are distributed in two or more devices (e.g. a PVOL exists in a storage control system 200 and an SVOL exists in another storage control system). Also in the above embodiment, there are two levels of disk devices, one has high reliability and high performance, and the other has low reliability and low performance, but more levels of disk devices may be used. Also in the present embodiment, a plurality of thresholds may be used for at least one of the update frequency threshold and the disk ratio threshold, for a more refined adjustment. Two types of disk ratio thresholds may be provided for the FC storage capacity ratio and the SATA storage capacity ratio. The data update frequency is a number of times of data updates in a predetermined period, but may simply be an update frequency, regardless the period.

What is claimed is:

1. A storage system, comprising:
a plurality of storage devices including a first type storage device and a second type storage device, a reliability attribute and/or a performance attribute of the first type storage device being different from a reliability attribute and/or a performance attribute of the second type storage device; and
a control unit managing a plurality of virtual volumes, a plurality of first type storage areas and a plurality of second type storage areas, each of the plurality of virtual volumes being adapted to be accessed from an external device by specifying a logical unit number, the plurality of first type storage areas being provided with the first type storage device, the plurality of second type storage areas being provided with the second type storage device,
wherein, if necessary, a storage area allocated to a first portion of a virtual volume of the plurality of virtual volumes is changed from a first type storage area of the plurality of first type storage areas to a second type storage area of the plurality of second type storage areas while another first type storage area of the plurality of first type storage areas is allocated to a second portion of the virtual volume.

2. The storage system according to claim 1, wherein:
the control unit is adapted to change, if necessary, the storage area allocated to the first portion of the virtual volume from the first type storage area to the second type storage area in the status in which the another first type storage area of the plurality of first type storage areas is allocated to the second portion of the virtual volume.

3. The storage system according to claim 1, wherein:
the storage area allocated to the first portion of the virtual volume is changed from the first type storage area to the second type storage area if a frequency of storing data to the first portion of the virtual volume reaches a threshold.

4. The storage system according to claim 1, wherein:
a frequency of storing data to the second type storage area allocated to the first portion of the virtual volume is different from a frequency of storing data to the another first type storage area allocated to the second portion of the virtual volume.

5. The storage system according to claim 1, wherein:
the plurality of first type storage areas are provided with a first logical unit, the first logical unit being provided with a plurality of the first type storage devices, and
the plurality of second type storage areas are provided with a second logical unit, the second logical unit being provided with a plurality of the second type storage devices.

6. The storage system according to claim 1, wherein:
the plurality of first type storage areas are a plurality of first type chunks provided with a first logical unit, the first logical unit being provided with a plurality of the first type storage devices, and
the plurality of second type storage areas are a plurality of second type chunks provided with a second logical unit, the second logical unit being provided with a plurality of the second type storage devices.

7. The storage system according to claim 1, wherein:
if the first portion of the virtual volume is changed from the first type storage area to the second type storage area, the storage system executes the steps of:
copying data stored in the first type storage area allocated to the first portion of the virtual volume to the second type storage area, and
allocating the second type storage area, instead of the first type storage area, to the first portion of the virtual volume.

8. The storage system according to claim 1, wherein:
the first type storage device is a fibre channel (FC) disk device, and
the second type storage device is a serial ATA (SATA) disk device.

9. The storage system according to claim 1, wherein:
the first type storage device is a fibre channel (FC) disk device,
the second type storage device is a serial ATA (SATA) disk device, and
the storage area allocated to the first portion of the virtual volume is changed from the first type storage area to the second type storage area, if a frequency of storing data to the first portion of the virtual volume is lower than a threshold.

10. The storage system according to claim 1, wherein:
the first type storage device is a serial ATA (SATA) disk device,
the second type storage device is a fibre channel (FC) disk device, and
the storage area allocated to the first portion of the virtual volume is changed from the first type storage area to the second type storage area, if a frequency of storing data to the first type storage area allocated to the first portion of the virtual volume is equal to or higher than a threshold.

11. The storage system according to claim 1, wherein:
the virtual volume is duplicated with another virtual volume of the plurality of virtual volumes.

12. The storage system according to claim 1, wherein:
the virtual volume is a secondary volume duplicated with another virtual volume of the plurality of virtual volumes.

13. The storage system according to claim 1, wherein:
the external device is a server.

14. The storage system according to claim 1, wherein:
the reliability attribute is at least one of a durability, a probability of failure and a mean time between failure (MTBF).

15. The storage system according to claim 1, wherein:
the performance attribute is at least one of a value of a data transfer and a speed of response.

16. The storage system according to claim 1, wherein:
the control unit manages a pool including the plurality of first type storage areas and the plurality of second type storage areas.

17. The storage system according to claim 1, wherein:
the control unit manages a frequency of storing data to the first portion of the virtual volume and a frequency of storing data to the second portion of the virtual volume.

18. The storage system according to claim 1, wherein:
wherein the storage system, if necessary, is adapted to change a storage area allocated to the second portion of the virtual volume from the another first type storage area to another second type storage area of the plurality of second type storage areas while the second type storage area is allocated to the first portion of the virtual volume.

19. A storage system, comprising:
a plurality of storage devices including a first type storage device and a second type storage device, specifications of the first type storage device being different from specifications of the second type storage device; and
a control unit managing a plurality of virtual volumes, a plurality of first type storage areas and a plurality of second type storage areas, a virtual volume of the plurality of virtual volumes being adapted to be accessed from an external device by specifying a logical unit number, the plurality of first type storage areas being provided with the first type storage device, the plurality of second type storage areas being provided with the second type storage device,
wherein, if necessary, a storage area allocated to a first portion of the virtual volume is changed from a first type storage area of the plurality of first type storage areas to a second type storage area of the plurality of second type storage areas while another first type storage area of the plurality of first type storage areas is allocated to a second portion of the virtual volume.

20. The storage system according to claim 19, wherein:
the control unit is adapted to change, if necessary, the storage area allocated to the first portion of the virtual volume from the first type storage area to the second type storage area in the status in which the another first type storage area of the plurality of first type storage areas is allocated to the second portion of the virtual volume.

21. The storage system according to claim 19, wherein:
the storage area allocated to the first portion of the virtual volume is changed from the first type storage area to the second type storage area if a frequency of storing data to the first portion of the virtual volume reaches a threshold.

22. The storage system according to claim 19, wherein:
the plurality of first type storage areas are provided with a first logical unit, the first logical unit being provided with a plurality of the first type storage devices, and
the plurality of second type storage areas are provided with a second logical unit, the second logical unit being provided with a plurality of the second type storage devices.

23. The storage system according to claim 19, wherein:
the first type storage device is a fibre channel (FC) disk device, and
the second type storage device is a serial ATA (SATA) disk device.

24. The storage system according to claim 19, wherein:
the first type storage device is a fibre channel (FC) disk device,
the second type storage device is a serial ATA (SATA) disk device, and
the storage area allocated to the first portion of the virtual volume is changed from the first type storage area to the second type storage area, if a frequency of storing data to the first portion of the virtual volume is lower than a threshold.

25. The storage system according to claim 19, wherein:
the virtual volume is duplicated with another virtual volume of the plurality of virtual volumes.

26. The storage system according to claim 19, wherein:
the specifications include at least one of a durability, a probability of failure and a mean time between failure (MTBF).

27. The storage system according to claim 19, wherein:
the specifications include at least one of a value of a data transfer and a speed of response.

28. The storage system according to claim 19, wherein:
the control unit manages a pool including the plurality of first type storage areas and the plurality of second type storage areas.

29. The storage system according to claim 19, wherein:
the control unit manages a frequency of storing data to the first portion of the virtual volume and a frequency of storing data to the second portion of the virtual volume.

30. The storage system according to claim 19, wherein:
wherein the storage system is adapted to change, if necessary, a storage area allocated to the second portion of the virtual volume from the another first type storage area to another second type storage area of the plurality of second type storage areas while the second type storage area is allocated to the first portion of the virtual volume.

31. A control method for a storage system, comprising the steps of:
managing a plurality of storage devices including a first type storage device and a second type storage device, the first type storage device having a different reliability attribute and/or performance attribute from the second type storage device;
managing a plurality of virtual volumes, a plurality of first type storage areas and a plurality of second type storage areas, a virtual volume of the plurality of virtual volumes being adapted to be accessed from an external device by specifying a logical unit number, the plurality of first type storage areas being provided with the first type storage device, the plurality of second type storage areas being provided with the second type storage device;
changing, if necessary, a storage area allocated to a first portion of the virtual volume from a first type storage area of the plurality of first type storage areas to a second type storage area of the plurality of second type storage areas while another first type storage area of the plurality of first type storage areas is allocated to a second portion of the virtual volume.

32. The control method according to claim 31, wherein:
the changing step is controlled by a control unit managing the plurality of virtual volumes, the plurality of first type storage areas and the plurality of second type storage areas.

33. The control method according to claim 31, wherein:
the changing step is executed, if a frequency of storing data to the first portion of the virtual volume reaches a threshold.

34. The control method according to claim 31, wherein:
the plurality of first type storage areas are provided with a first logical unit, the first logical unit being provided with a plurality of the first type storage devices, and
the plurality of second type storage areas are provided with a second logical unit, the second logical unit being provided with a plurality of the second type storage devices.

35. The control method according to claim 31, wherein:
the first type storage device is a fibre channel (FC) disk device, and
the second type storage device is a serial ATA (SATA) disk device.

36. The control method according to claim 31, wherein:
the first type storage device is a fibre channel (FC) disk device,
the second type storage device is a serial ATA (SATA) disk device, and
the changing step is executed, if a frequency of storing data to the first portion of the virtual volume is lower than a threshold.

37. The control method according to claim 31, further comprising the step of:
duplicating the virtual volume with another virtual volume of the plurality of virtual volumes.

38. The control method according to claim 31, wherein:
the reliability attribute is at least one of a durability, a probability of failure and a mean time between failure (MTBF).

39. The control method according to claim 31, wherein:
the performance attribute is at least one of a value of a data transfer and a speed of response.

40. The control method according to claim 31, further comprising the step of:
managing a pool including the plurality of first type storage areas and the plurality of second type storage areas.

41. The control method according to claim 31, further comprising the step of:
managing a frequency of storing data to the first portion of the virtual volume and a frequency of storing data to the second portion of the virtual volume.

42. The control method according to claim 31, further comprising the step of:
changing, if necessary, a storage area allocated to the second portion of the virtual volume from the another first type storage area to another second type storage area of the plurality of second type storage areas while the second type storage area is allocated to the first portion of the virtual volume.

43. A computer program stored in a computer readable storage medium and executable by a storage system, the computer program comprising:
a code for managing a plurality of storage devices including a first type storage device and a second type storage device, the first type storage device having different specifications from the second type storage device;
a code for managing a plurality of virtual volumes, a plurality of first type storage areas and a plurality of second type storage areas, a virtual volume of the plurality of virtual volumes being adapted to be accessed from an external device by specifying a logical unit number, the plurality of first type storage areas being provided with the first type storage device, the plurality of second type storage areas being provided with the second type storage device;
a code for changing, if necessary, a storage area allocated to a first portion of the virtual volume from a first type storage area of the plurality of first type storage areas to a second type storage area of the plurality of second type storage areas while another first type storage area of the plurality of first type storage areas is allocated to a second portion of the virtual volume.

44. The computer program according to claim 43, wherein:
the code for changing step is controlled by a control unit managing the plurality of virtual volumes, the plurality of first type storage areas and the plurality of second type storage areas.

45. The computer program according to claim 43, wherein:
the code for changing step is executed if a frequency of storing data to the first portion of the virtual volume reaches a threshold.

46. The computer program according to claim 43, wherein:
the plurality of first type storage areas are provided with a first logical unit, the first logical unit being provided with a plurality of the first type storage devices, and
the plurality of second type storage areas are provided with a second logical unit, the second logical unit being provided with a plurality of the second type storage devices.

47. The computer program according to claim 43, wherein:
the first type storage device is a fibre channel (FC) disk device, and
the second type storage device is a serial ATA (SATA) disk device.

48. The computer program according to claim 43, wherein:
the first type storage device is a fibre channel (FC) disk device,
the second type storage device is a serial ATA (SATA) disk device, and
the code for changing step is executed, if a frequency of storing data to the first portion of the virtual volume is lower than a threshold.

49. The computer program according to claim 43, comprising:
a code for duplicating the virtual volume with another virtual volume of the plurality of virtual volumes.

50. The computer program according to claim 43, wherein:
the reliability attribute is at least one of a durability, a probability of failure and a mean time between failure (MTBF).

51. The computer program according to claim 43, wherein:
the performance attribute is at least one of a value of a data transfer and a speed of response.

52. The computer program according to claim 43, comprising:
a code for managing a pool including the plurality of first type storage areas and the plurality of second type storage areas.

53. The computer program according to claim 43, comprising:
a code for managing a frequency of storing data to the first portion of the virtual volume and a frequency of storing data to the second portion of the virtual volume.

54. The computer program according to claim 43, comprising:
a code for changing, if necessary, a storage area allocated to the second portion of the virtual volume from the another first type storage area to another second type storage area of the plurality of second type storage areas while the second type storage area is allocated to the first portion of the virtual volume.

55. The computer program according to claim 43, wherein:
the code for changing step, executes the steps of:
copying data stored in the first type storage area allocated to the first portion of the virtual volume to the second type storage area, and
allocating the second type storage area, instead of the first type storage area, to the first portion of the virtual volume.

* * * * *